(12) United States Patent
Lawson et al.

(10) Patent No.: US 10,180,052 B1
(45) Date of Patent: Jan. 15, 2019

(54) PROCESSING OF OIL BY STEAM ADDITION

(71) Applicant: PHILLIPS 66 COMPANY, Houston, TX (US)

(72) Inventors: Keith H. Lawson, Bartlesville, OK (US); Derek H. Willman, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 0 days.

(21) Appl. No.: 15/819,680

(22) Filed: Nov. 21, 2017

(51) Int. Cl.
  *B01D 17/04* (2006.01)
  *C10G 33/04* (2006.01)
  *E21B 43/24* (2006.01)
(52) U.S. Cl.
  CPC ........ *E21B 43/2406* (2013.01); *B01D 17/045* (2013.01); *C10G 33/04* (2013.01)
(58) Field of Classification Search
  CPC ..... E21B 43/24; E21B 43/2406; B01D 17/04; B01D 17/045; C10G 33/04
  See application file for complete search history.

(56) References Cited

U.S. PATENT DOCUMENTS

| 5,746,908 A | 5/1998 | Mitchell | |
|---|---|---|---|
| 2008/0251421 A1* | 10/2008 | Liverud | C10G 31/08 208/187 |
| 2012/0217187 A1* | 8/2012 | Sharma | C10G 1/002 208/390 |
| 2014/0001097 A1* | 1/2014 | Jothy | C10L 3/12 208/177 |

OTHER PUBLICATIONS

H. Linga, ProPure; F.A. Al-Qahtani, SPE and S.N. Al-Qahtani, SPE, Saudi Aramco, "New Mixer Optimizes Crude Desalting Plant", SPE 124823-PP, SPE International, 2009, 9 pages.

* cited by examiner

Primary Examiner — Zakiya W Bates
Assistant Examiner — Crystal J Miller
(74) Attorney, Agent, or Firm — Phillips 66 Company

(57) ABSTRACT

The invention relates to injecting steam into crude oil for several benefits, primarily of which is to remove salt by transferring the salt into the condensed water from the steam. Steam transfers salt via a different transfer mechanism and therefore doesn't require the high shear mixing of conventional water injection systems. As such, steam injection through a variety of procedures, is more efficient at gathering salt into water that itself is easier to remove from the crude oil.

8 Claims, 32 Drawing Sheets

PROCESSING OF OIL BY STEAM ADDITION

CROSS-REFERENCE TO RELATED APPLICATIONS

None.

STATEMENT REGARDING FEDERALLY SPONSORED RESEARCH OR DEVELOPMENT

None.

FIELD OF THE INVENTION

This invention relates to improving the efficiency of refining crude oil and especially to removing salt from crude oil in a refinery.

BACKGROUND OF THE INVENTION

Refineries typically obtain crude oil from a number of sources having different characteristics such as viscosity, density, sulfur content, salt and other impurities, etc. Each of these crudes are delivered to a refinery via pipelines, ships and other crude carriers and stored in large tanks until the refinery is ready to refine it. Typically, a refinery works to blend various crudes in preferred proportions recognizing that each of the various crudes have different levels of their constituent components, both good and bad, in an attempt to optimize the utility of the various systems with that specific refinery. One of the first operations in the refinery for processing the crude oil is to remove salt and other contaminants from the crude. Salts that are typically found in crude oil are chlorides of sodium, magnesium and calcium and it is necessary to remove these salts to avoid the creation of hydrochloric acid within the refinery which is highly corrosive. Salt is typically removed by injecting clean water into the crude oil such that water droplets are dispersed into the crude oil such that any salt in the crude may be captured or transferred into the water. To absorb the greatest amount of salt, it is generally desired to create a great number of reasonably small water droplets in the crude oil to transfer the salt into those droplets. However, the refinery operator wants as little water taken up into the refinery from the desalter system as possible. So while it is desirable to have a lot of very small droplets, it is also desirable that a minimal amount of water is put into the crude oil and that the water droplets are amenable to being quickly and easily removed from the crude oil after the salt has been captured by the water droplets.

As the water must be removed, the droplets are typically removed based on density differences between the crude oil and the water by allowing the emulsion to rest in a large settling vessel where the heavier water settles to the bottom. Unfortunately, this can be a slow process, especially when the droplets are very small and tend to settle very slowly. This problem is particularly challenging for more viscous and denser crude oils. One approach to aid removal of the water droplets is to reduce the viscosity of the crude by heating. So, it is not uncommon for refineries to heat the crude oil as it comes into the desalter system to reduce the effective viscosity of the crude oil and accelerate the rate that droplets descend to the bottom of the settling tank.

Another approach has been to increase the coalescence of water droplets by imposing an electric field that cause the water droplets to be concentrated together and form larger droplets that separate faster. Other coalescer technologies where the emulsion is gently mixed to again bring the water droplets together to coalesce have been proposed.

Clearly, refineries work best when the crudes have less undesirable materials dissolved therein and any opportunity to efficiently and simply remove such contaminants from the crude oil would be well received by refinery operators.

BRIEF SUMMARY OF THE DISCLOSURE

The invention more particularly relates to a process for reducing electrical energy consumption for pumping crude oil from at least one remote storage tank through a pipe to a desalter system in a refinery. The process includes the creation of steam, identifying crude oil that is about to be pumped through a pipe from a remote storage tank to the desalter system in the refinery and identifying a location in the pipe at which steam may be added to the crude oil as it is to pass through along the way from the storage tank to the desalter system. Crude oil is then pumped through the pipe to the desalter system and steam is injected into the crude oil in the pipe such that the crude oil is heated by the steam thereby lowering viscosity of the crude oil and reducing resistance to flow and thereby reducing the electric energy requirement to move the crude oil to the desalter system where the condensed steam is removed from the crude oil in the desalter system.

The invention more particularly relates to a process for removing salt from crude oil wherein the salt may be in the form of particles of crystalline salt suspended in the crude oil or as small droplets of brine water suspended in the crude oil, or both. The process comprises injecting steam into the crude oil in the form of steam bubbles that are quite large relative to any salt particles or relative to any small droplets of brine water so as to create steam bubbles that will have substantial contact with the crude oil along with any nearby suspended salt particles and brine droplets, such that a single steam bubble may contact numerous salt particles and brine droplets. The steam is condensed into droplets of liquid water while at the same time the steam dissolves available salt particles resulting in new brine droplets and also delivers a portion of the water, whether liquid or vapor, within steam bubbles into any available small brine droplets enlarging the brine droplets to a size more amenable for separation from the crude oil. The liquid water is then separated from the crude oil where the liquid water has the salt dissolved therein. The process is particularly characterized in that it does not include imposing high shear mixing of the injected steam to increase contact between the suspended salt and either the steam or the resulting water.

The invention more particularly relates to a process for removing salt from crude oil wherein the salt may be in the form of particles of crystalline salt suspended in the crude oil or as small droplets of brine water suspended in the crude oil, or both. The process includes injecting steam into the crude oil in the form of steam bubbles that are quite large relative to any salt particles or relative to any small droplets of brine water so as to create steam bubbles that will have substantial contact with the crude oil along with any nearby suspended salt particles and brine droplets, such that a single steam bubble may contact numerous salt particles and brine droplets. The steam bubbles collapse and condense into droplets of liquid water while at the same time dissolves available salt particles or crystals creating new brine droplets and also delivering a portion of the water, whether vaporous or liquid, within steam bubbles into any available small brine droplets resulting in enlarged brine droplets having a size more amenable for separation from the crude oil. Liquid water is also injected into the crude oil before during or after the steam is injected and aggressive high shear mixing is imposed on the crude oil with water therein in a high shear mixer to enhance contact between salt particles, brine droplets and water droplets to enhance dissolving of salt particles and coalescence of brine droplets with water. The liquid water is then separated from the crude oil where the separated water includes the salt dissolved therein. The process is characterized in that it does not include imposing high shear mixing of uncondensed steam bubbles within the crude oil to increase contact between injected water and the suspended salt.

The invention more particularly relates to a process for removing salt from crude oil wherein the salt may be in the form of particles of crystalline salt suspended in the crude oil or as small droplets of brine water suspended in the crude oil, or both. The process includes injecting liquid water into the crude oil and imposing aggressive high shear mixing on the crude oil and water in a high shear mixer to break up the injected water into smaller droplets of water and, at the same time, enhance contact of the smaller droplets of water with salt particles and brine droplets to enhance dissolving of salt particles and also to coalesce droplets of water whether brine droplets or droplets of injected water. After the aggressive high shear mixing, the process includes injecting steam into the crude oil in the form of steam bubbles that are quite large relative to any salt particles or relative to any brine droplets and also relative to water droplets so as to create steam bubbles that will have substantial contact with the crude oil along with any nearby suspended salt particles and other droplets, such that a single steam bubble may actually contact numerous salt particles and water droplets. The steam bubbles are then condensed into droplets of liquid water while at the same time dissolving available salt particles forming new brine droplets and also delivering a portion of the water, whether liquid or vapor, within steam bubbles into any available water and brine droplets resulting in enlarged water and brine droplets having a size more amenable for separation from the crude oil. Thereafter, the liquid water is separated from the crude oil such that the salt dissolved goes with the separated water. This process is particularly characterized in that it does not include imposing high shear mixing of uncondensed steam bubbles within the crude oil.

The invention more particularly relates to a process for removing salt from crude oil wherein the salt may be in the form of particles of crystalline salt suspended in the crude oil or as small droplets of brine water suspended in the crude oil, or both. The process includes injecting steam into the crude oil in the form of steam bubbles that are quite large relative to any salt particles or relative to the any small droplets of brine water so as to create steam bubbles that will have substantial contact with the crude oil along with any nearby suspended salt particles and with brine droplets, such that a single steam bubble may actually contact many salt particles and brine droplets. The steam bubbles collapse and condense into droplets of liquid water while at the same time dissolving available salt particles forming new brine droplets and also delivering a portion of the water, whether liquid or vapor, within steam bubbles into any available small brine droplets resulting in enlarged brine droplets having a size more amenable for separation from the crude oil. The liquid water is then separated from the crude oil such that the water has the salt dissolved therein to thereby remove the salt and water from the crude oil and thereby form a first pass desalted crude oil. This process is particularly characterized in that it does not impose high shear mixing on steam bubbles or resulting condensed water prior to water separation from the crude oil. Thereafter, liquid water is injected into the first pass desalted crude oil and aggressive high shear mixing is imposed on the injected water and first pass desalted crude oil to break up the injected water into smaller droplets of water and, at the same time, enhance contact of the smaller droplets of water with remaining salt particles and remaining brine droplets to enhance dissolving of salt particles and also to coalesce droplets of water whether brine droplets or droplets of injected water. Thereafter, the liquid water is separated from the first pass desalted crude oil with any salt dissolved in the water to thereby remove salt and water from the first pass desalted crude.

The invention more particularly relates to a process for removing salt from crude oil wherein the salt may be in the form of particles of crystalline salt suspended in the crude oil or as small droplets of brine water suspended in the crude oil, or both. The process includes injecting a first stream of steam into the crude oil in the form of steam bubbles that are quite large relative to any salt particles or relative to any small droplets of brine water so as to create steam bubbles that will have substantial contact with the crude oil along with any nearby suspended salt particles and brine droplets, such that a single steam bubble may actually contact numerous salt particles and brine droplets. Water is injected before, after or concurrently with the steam and the steam bubbles collapse and condense into droplets of liquid water while at the same time dissolving available salt particles forming new brine droplets and also delivering a portion of the liquid or vaporous water within steam bubbles into any available small brine droplets resulting in enlarged brine droplets having a size more amenable for separation from the crude oil. After the steam bubbles have collapsed and condensed and the water is injected, aggressive high shear mixing is imposed on the crude oil and water in a high shear mixer to enhance contact between salt particles, brine droplets and water droplets to enhance dissolving of salt particles and coalescence of brine droplets with water. Then the liquid water is separated from the crude oil where the salt is dissolved in the water and goes out with the water and the crude oil from the separator forms a first pass desalted crude oil. Thereafter, a second stream of steam is injected into the first pass desalted crude oil in the form of steam bubbles that are quite large relative to any remaining salt particles or relative to the any remaining droplets of brine water so as to create steam bubbles that will have substantial contact with the first pass desalted crude oil along with any nearby suspended salt particles and brine droplets. This way, a single steam bubble may actually contact numerous remaining salt particles and remaining brine droplets. Thereafter, the steam bubbles collapse and condense in the first pass desalted crude oil into droplets of liquid water while at the same time dissolving any remaining available salt particles creating new brine droplets and also delivering a portion of the water, whether liquid or vapor, within steam bubbles into any remaining available small brine droplets resulting in enlarged brine droplets having a size more amenable for separation from the first pass desalted crude oil. The liquid water is then separated from the first pass desalted crude oil where salt is dissolved in the water and the crude from this second separation is a twice desalted crude oil. The process is particularly characterized in that it does not include imposing high shear mixing of uncondensed steam bubbles within the crude oil or within the first pass desalted crude oil.

The invention more particularly relates to a process for removing salt from crude oil wherein the salt may be in the form of particles of crystalline salt suspended in the crude oil or as small droplets of brine water suspended in the crude oil, or both. The process includes injecting liquid water into the crude oil and then imposing aggressive high shear mixing on the crude oil and water in a high shear mixer to break up the injected water into smaller droplets of water and, at the same time, create impactful contacts of the smaller droplets of water with salt particles and brine droplets to enhance dissolving of salt particles and also coalesce droplets of water whether brine droplets or droplets of injected water. After the aggressive high shear mixing, steam is injected into the crude oil in the form of steam bubbles that are quite large relative to any salt particles or relative to any brine droplets and also relative to water droplets so as to create steam bubbles that will have substantial contact with the crude oil along with any nearby suspended salt particles and other droplets, such that a single steam bubble may actually contact a number of salt particles and water droplets. The steam bubbles are condensed into droplets of liquid water while at the same time dissolving available salt particles to create new brine droplets and also delivering a portion of the water, whether liquid or vapor, within steam bubbles into any available water and brine droplets resulting in enlarged water and brine droplets having sizes more amenable for separation from the crude oil. The liquid water is then separated from the crude oil where the liquid water separated from the crude includes salt dissolved therein that had been suspended in the crude oil such that the crude oil is then deemed a first pass desalted crude oil. The first pass desalted crude then has a second injection of a steam in the form of steam bubbles that are quite large relative to any remaining salt particles or relative to any remaining brine droplets so as to create steam bubbles that will have substantial contact with the first pass desalted crude oil along with any nearby suspended salt particles and other droplets, such that a single steam bubble may contact a number of salt particles and water droplets. The steam bubbles are then collapsed and condensed into droplets of liquid water while at the same time dissolving available salt particles creating new brine droplets and also delivering a portion of the water, whether liquid or vapor, within steam bubbles into any available water droplets and any remaining available brine droplets resulting in enlarged water and brine droplets having a size more amenable for separation from the first pass desalted crude oil. Then, the liquid water in the first pass desalted crude oil is separated such that salt dissolved in the liquid water goes with the water leaving a second pass desalted crude oil. The process is particularly characterized in that it does not include imposing high shear mixing of uncondensed steam bubbles within the crude oil.

The invention more particularly relates to a process for heating crude oil and also removing salt from crude oil wherein the salt may be in the form of particles of crystalline salt suspended in the crude oil or as small droplets of brine water suspended in the crude oil, or both. The process includes creating steam and moving crude oil having suspended salt therein through a vessel having walls on all sides except for an inlet and an outlet. Steam is injected steam into the moving crude oil at a location within the crude oil in such a manner that as the injected steam enters the crude oil, it forms steam bubbles about which at least 95% of the steam bubbles condense and collapse into water droplets within the crude oil without ever contacting any walls of the vessel. As the steam bubbles condense and collapse, salt that was suspended in the crude oil is transferred to water resulting from condensed steam bubbles by contacting the salt with water before during or after steam bubble condensation. The water is then separated and removed from the crude oil where the water takes salt that had been suspended in the crude oil with it.

The invention more particularly relates to a process for removing salt from crude oil wherein the salt may be in the form of particles of crystalline salt suspended in the crude oil or as small droplets of brine water suspended in the crude oil, or both. The process includes injecting steam into the crude oil in the form of steam bubbles that are quite large relative to any salt particles or relative to the any small droplets of brine water so as to create steam bubbles that will have substantial contact with the crude oil along with any nearby suspended salt particles and brine droplets, such that a single steam bubble may actually contact many salt particles and brine droplets. Before, during or after the steam is injected, a first stream of liquid water is also injected into the crude oil. The steam bubbles are condensed into droplets of liquid water while at the same time dissolving available salt particles creating new brine droplets and also delivering a portion of the water, whether liquid or vapor, within steam bubbles into any available small brine droplets resulting in enlarged brine droplets having a size more amenable for separation from the crude oil. After the steam bubbles have collapsed and condensed, aggressive high shear mixing is imposed on the crude oil and water in a high shear mixer to enhance contact between salt particles, brine droplets and water droplets to enhance dissolving of salt particles and coalescence of brine droplets with water. The liquid water is then separated from the crude oil where the water takes the dissolved salt dissolved with it and the remaining crude oil is deemed a first pass desalted crude oil. Then, the first pass desalted crude oil gets a second injection of liquid water followed aggressive high shear mixing in a high shear mixer to enhance contact between salt particles, brine droplets and water droplets to enhance dissolving of salt particles and coalescence of brine droplets with water. The liquid water is then separated from the first pass desalted crude oil where the separated water includes salt dissolved therein that had just previously been suspended in the crude oil so that the crude oil after the water is separated is deemed to be a twice desalted crude oil. The process is particularly characterized in that it does not include imposing high shear mixing of uncondensed steam bubbles within the crude oil.

The invention more particularly relates to a process for removing salt from crude oil wherein the salt may be in the form of particles of crystalline salt suspended in the crude oil or as small droplets of brine water suspended in the crude oil, or both. The process includes injecting a first stream of liquid water into the crude oil and imposing aggressive high shear mixing on the crude oil and water in a high shear mixer to enhance contact between salt particles, brine droplets and water droplets to enhance dissolving of salt particles and coalescence of brine droplets with water. Thereafter, steam is injected into the crude oil in the form of steam bubbles that are quite large relative to any salt particles or relative to the any droplets of water including brine water so as to create steam bubbles that will have substantial contact with the crude oil along with any nearby suspended salt particles and brine droplets, such that a single steam bubble may actually contact many salt particles and water droplets. The steam bubbles are condensed and collapsed into droplets of liquid water while at the same time dissolving available salt particles creating new brine droplets and also delivering a portion of the water, whether liquid or vapor, within steam bubbles into any available water droplets resulting in enlarged water droplets having a size more amenable for separation from the crude oil. The liquid water is then separated from the crude oil where the separated water includes salt dissolved therein and the crude oil from this separation forms a first pass desalted crude oil. A second stream of liquid water is injected into the first pass desalted crude oil and aggressive high shear mixing is imposed on the first pass desalted crude oil and water in a high shear mixer to enhance contact between salt particles, brine droplets and water droplets to enhance dissolving of salt particles and coalescence of brine droplets with water. Liquid water is then separated and removed from the first pass desalted crude oil where the water includes dissolved salt that was previously suspended in the first pass desalted crude oil. With this second stage water removal, the crude oil is deemed a twice desalted crude oil. The overall process is particularly characterized in that it does not include imposing high shear mixing of uncondensed steam bubbles within the crude oil.

The invention more particularly relates to a process for removing salt from crude oil wherein the salt may be in the form of particles of crystalline salt suspended in the crude oil or as small droplets of brine water suspended in the crude oil, or both. The process includes injecting a first stream of steam into the crude oil in the form of steam bubbles that are quite large relative to any salt particles or relative to the any small droplets of brine water so as to create steam bubbles that will have substantial contact with the crude oil along with any nearby suspended salt particles and brine droplets, such that a single steam bubble may actually contact numerous salt particles and brine droplets. The steam bubbles are condensed into droplets of liquid water while at the same time dissolving available salt particles forming new brine droplets and also delivering a portion of the water, whether liquid or vapor, within steam bubbles into any available small brine droplets resulting in enlarged brine droplets having a size more amenable for separation from the crude oil. The liquid water is then separated and removed from the crude oil where the removed water includes dissolved salt therein that was suspended in the crude oil where the separated crude oil thereby forms a first pass desalted crude oil. Liquid water is then injected into the first pass desalted crude oil and aggressive high shear mixing is imposed on the injected water and first pass desalted crude oil to break up the injected water into smaller droplets of water and, at the same time, create impactful contacts of the smaller droplets of water with remaining salt particles and remaining brine droplets to enhance dissolving of salt particles and also to coalesce the droplets of water whether brine droplets or droplets of injected water. After the aggressive high shear mixing, a second stream of steam is injected into the first pass desalted crude oil in the form of steam bubbles that are quite large relative to any salt particles or relative to the any small droplets of brine water so as to create steam bubbles that will have substantial contact with the first pass desalted crude oil along with any nearby remaining suspended salt particles and remaining water droplets including any remaining brine droplets, such that a single steam bubble may actually contact numerous salt particles and brine droplets. The steam bubbles are condensed into droplets of liquid water while at the same time the steam bubbles dissolve any remaining and available salt particles resulting in new brine droplets and also delivering a portion of the water, either or both liquid and vapor, within steam bubbles into any remaining and available small brine droplets resulting in enlarged brine droplets having a size more amenable for separation from the crude oil. The liquid water is then separated and removed from the first pass desalted crude oil where any dissolved salt is in the removed water and the crude oil is then twice desalted. The overall process is particularly characterized in that it does not include imposing high shear mixing of uncondensed steam bubbles within the crude oil.

The invention more particularly relates to a process for removing salt from crude oil wherein the salt may be in the form of particles of crystalline salt suspended in the crude oil or as small droplets of brine water suspended in the crude oil, or both. The process includes injecting a first stream of steam into the crude oil in the form of steam bubbles that are quite large relative to any salt particles or relative to the any small droplets of brine water so as to create steam bubbles that will have substantial contact with the crude oil along with any nearby suspended salt particles and brine droplets, such that a single steam bubble may actually contact numerous salt particles and brine droplets. The steam bubbles are condensed into droplets of liquid water while at the same time dissolving available salt particles creating new brine droplets and also delivering a portion of the water, either or both liquid and vapor, within steam bubbles into any available small brine droplets resulting in enlarged brine droplets having a size more amenable for separation from the crude oil. The liquid water resulting from the condensation of the steam bubbles is then separated and removed from the crude oil including water with dissolved salt therein to thereby remove the salt and water from the crude oil and thereby form a first pass desalted crude oil. The first pass desalted crude oil then receives a second stream of steam injected in the form of steam bubbles that are quite large relative to any salt particles or relative to the any small droplets of brine water so as to create steam bubbles that will have substantial contact with the first pass desalted crude oil along with any nearby remaining suspended salt particles and remaining water droplets including any remaining brine droplets, such that a single steam bubble may actually contact numerous salt particles and brine droplets. The steam bubbles are collapsed and condensed into droplets of liquid water while at the same time dissolving any remaining and available salt particles forming new brine droplets and also delivering a portion of the water, either liquid or vapor or both, within steam bubbles into any remaining and available small brine droplets resulting in enlarged brine droplets having a size more amenable for separation from the crude oil. Thereafter, liquid water is injected into the first pass desalted crude oil which is then subjected to aggressive high shear mixing to break up the injected water into smaller droplets of water and, at the same time, create impactful contacts of the smaller droplets of water with remaining salt particles and remaining brine droplets to enhance dissolving of salt particles and also coalesce droplets of water whether brine droplets or droplets of injected water. The liquid water is then separated and removed from the first pass desalted crude oil with any dissolved salt therein to thereby remove salt and water from the first pass desalted crude. The overall process is particularly characterized in that it does not include imposing high shear mixing of uncondensed steam bubbles within the crude oil.

The invention more particularly relates to a process for removing salt from crude oil wherein the salt may be in the form of particles of crystalline salt suspended in the crude oil or as small droplets of brine water suspended in the crude oil, or both. The process includes injecting a first stream of steam into the crude oil in the form of steam bubbles that are quite large relative to any salt particles or relative to the any small droplets of brine water so as to create steam bubbles that will have substantial contact with the crude oil along with any nearby suspended salt particles and brine droplets, such that a single steam bubble may contact numerous salt particles and brine droplets. The steam bubbles are collapsed and condensed into droplets of liquid water while at the same time dissolving available salt particles forming new brine droplets and also delivering a portion of the water, as either liquid or vapor or both, within steam bubbles into any available small brine droplets resulting in enlarged brine droplets having a size more amenable for separation from the crude oil. Either before, after or concurrently with the steam injection, a first stream of liquid water is injected into the crude oil. After the steam bubbles have all collapsed and condensed, aggressive high shear mixing is imposed on the injected water and the crude oil to break up the injected water into smaller droplets of water and, at the same time, enhance contact of the smaller droplets of water with remaining salt particles and remaining brine droplets to enhance dissolving of salt particles and also coalesce droplets of water whether brine droplets or droplets of injected water. The liquid water in the crude oil is then separated and removed from the crude oil where the water includes dissolved salt therein to thereby remove the salt and water from the crude oil and also, thereby, form a first pass desalted crude oil. Into the first pass desalted crude oil, a second stream of steam is injected in the form of steam bubbles that are quite large relative to any salt particles or relative to the any small droplets of brine water so as to create steam bubbles that will have substantial contact with the first pass desalted crude oil along with any nearby remaining suspended salt particles and remaining water droplets including any remaining brine droplets, such that a single steam bubble may contact numerous salt particles and brine droplets. The steam bubbles are then collapsed and condensed into droplets of liquid water while at the same time dissolving any remaining and available salt particles forming new brine droplets and also delivering a portion of the water, as either liquid or vapor or both, within steam bubbles into any remaining and available small brine droplets resulting in enlarged brine droplets having a size more amenable for separation from the crude oil. A second stream liquid water is injected into the first pass desalted crude oil and after the steam bubbles have fully collapsed and condensed, a second round of aggressive high shear mixing is imposed on the injected water and first pass desalted crude oil to break up the injected water into smaller droplets of water and, at the same time, enhance contact of the smaller droplets of water with remaining salt particles and remaining brine droplets to enhance dissolving of salt particles and also coalesce droplets of water whether brine droplets or droplets of injected water. Thereafter, the liquid water is separated and removed from the first pass desalted crude oil along with any dissolved salt therein to thereby remove salt and water from the first pass desalted crude. The overall process is particularly characterized in that it does not include imposing high shear mixing of uncondensed steam bubbles within the crude oil.

The invention more particularly relates to a process for removing salt from crude oil wherein the salt may be in the form of particles of crystalline salt suspended in the crude oil or as small droplets of brine water suspended in the crude oil, or both. The process includes injecting a first stream of liquid water into the crude oil and then imposing aggressive high shear mixing on the injected water and the crude oil to shred the injected water into smaller droplets of water and, at the same time, enhance contact of the smaller droplets of water with remaining salt particles and remaining brine droplets to enhance dissolving of salt particles and also coalesce droplets of water whether brine droplets or droplets of injected water. After the aggressive high shear mixing, a first stream of steam is injected into the crude oil in the form of steam bubbles that are quite large relative to any salt particles or relative to the any small droplets of brine water so as to create steam bubbles that will have substantial contact with the crude oil along with any nearby suspended salt particles and brine droplets, such that a single steam bubble may contact numerous salt particles and brine droplets. The steam bubbles collapse and condense into droplets of liquid water while at the same time dissolve available salt particles forming new brine droplets and also delivering a portion of the water, as liquid or vapor or both, within steam bubbles into any available small brine droplets resulting in enlarged brine droplets having a size more amenable for separation from the crude oil. Liquid water is then separated from the crude oil where water includes dissolved salt therein to thereby remove the salt and water from the crude oil and thereby form a first pass desalted crude oil. A second stream of liquid water is injected into the first pass desalted crude oil and aggressive high shear mixing is imposed on the injected water and first pass desalted crude oil to break up the injected water into smaller droplets of water and, at the same time, enhance contact of the smaller droplets of water with remaining salt particles and remaining brine droplets to enhance dissolving of salt particles and also coalesce droplets of water whether brine droplets or droplets of injected water. After the aggressive high shear mixing, a second stream of steam is injected into the first pass desalted crude oil in the form of steam bubbles that are quite large relative to any salt particles or relative to the any small droplets of brine water so as to create steam bubbles that will have substantial contact with the first pass desalted crude oil along with any nearby remaining suspended salt particles and remaining water droplets including any remaining brine droplets, such that a single steam bubble may contact numerous salt particles and brine droplets. The steam bubbles are then condensed into droplets of liquid water while at the same time dissolve any remaining and available salt particles forming new brine droplets and also delivering a portion of the water, as liquid, vapor or both, within steam bubbles into any remaining and available small brine droplets resulting in enlarged brine droplets having a size more amenable for separation from the crude oil. The liquid water is then separated and removed from the first pass desalted crude oil where any dissolved salt goes with the separated water forming a twice desalted crude oil. The overall process is particularly characterized in that it does not include imposing high shear mixing of uncondensed steam bubbles within the crude oil.

The invention more particularly relates to a process for removing salt from crude oil wherein the salt may be in the form of particles of crystalline salt suspended in the crude oil or as small droplets of brine water suspended in the crude oil, or both. The process includes injecting steam into the crude oil in the form of steam bubbles that are quite large relative to any salt particles or relative to the any small droplets of brine water so as to create contact between the steam bubbles and the crude oil along with any nearby suspended salt particles and brine droplets where a single steam bubble may actually contact numerous salt particles and brine droplets. The steam bubbles collapse and condense into droplets of liquid water while at the same time dissolving available salt particles creating new brine droplets and also delivering a portion of the water, whether liquid or vapor, within steam bubbles into any available small brine droplets resulting in enlarged brine droplets having a size more amenable for separation from the crude oil. Thereafter, liquid water is separated from the crude oil where the water includes salt dissolved therein. The process is particularly characterized in that it does not include imposing high shear mixing of the injected steam and further where the steam is injected into a steam-crude mixing zone against the direction of flow of the crude oil through the where the steam-crude mixing zone.

The invention more particularly relates to a process for removing salt from crude oil wherein the salt may be in the form of particles of crystalline salt suspended in the crude oil or as small droplets of brine water suspended in the crude oil, or both. The process includes injecting steam into the crude oil in the form of steam bubbles that are quite large relative to any salt particles or relative to the any small droplets of brine water so as to contact the steam bubbles with the crude oil along with any nearby suspended salt particles and brine droplets, such that a single steam bubble may actually contact many salt particles and brine droplets. The steam bubbles are condensed into droplets of liquid water while at the same time dissolving available salt particles forming new brine droplets and also delivering a portion of the water, whether liquid or vapor, within steam bubbles into any available small brine droplets resulting in enlarged brine droplets having a size more amenable for separation from the crude oil. The liquid water is then separated and removed from the crude oil where the removed water has salt that had been suspended in the crude oil dissolved therein. The process is particularly characterized in that it does not include imposing high shear mixing of the injected steam bubbles and wherein the steam injection occurs in a steam-crude mixing zone where crude oil flows through the steam-crude mixing zone in a defined direction of flow and the steam is injected at a low level within the direction of flow.

The invention more particularly relates to a process for removing salt from crude oil wherein the salt may be in the form of particles of crystalline salt suspended in the crude oil or as small droplets of brine water suspended in the crude oil, or both. The process includes injecting steam into the crude oil in the form of steam bubbles that are quite large relative to any salt particles or relative to the any small droplets of brine water so as to contact the steam bubbles with the crude oil along with any nearby suspended salt particles and brine droplets, such that a single steam bubble may actually contact numerous salt particles and brine droplets. The steam bubbles collapse and condense into droplets of liquid water while at the same time dissolving available salt particles creating new brine droplets and also delivering a portion of the water, whether liquid or vapor, within steam bubbles into any available small brine droplets resulting in enlarged brine droplets having a size more amenable for separation from the crude oil. Thereafter, the liquid water is separated from the crude oil such that the removed water includes salt dissolved therein. The process is particularly characterized in that it does not include imposing high shear mixing of steam bubbles within the crude oil and also where the steam is injected in a steam-crude mixing zone where crude oil flows through a venturi tube and into the steam-crude mixing zone and steam is injected to be drawn just downstream from peak flow rates of crude oil in the venturi to aggressively stir the steam bubbles into the crude oil but not shear the steam bubbles.

The invention more particularly relates to a process for removing salt from crude oil wherein the salt may be in the form of particles of crystalline salt suspended in the crude oil or as small droplets of brine water suspended in the crude oil, or both. The process includes injecting steam into the crude oil in the form of steam bubbles that are quite large relative to any salt particles or relative to the any small droplets of brine water so as to contact the steam bubbles with the crude oil along with any nearby suspended salt particles and brine droplets, such that a single steam bubble may contact numerous salt particles and brine droplets. The steam bubbles are collapsed and condensed into droplets of liquid water while at the same time dissolving available salt particles forming new brine droplets and also delivering a portion of the water, either as liquid or vapor or both, within steam bubbles into any available small brine droplets resulting in enlarged brine droplets having a size more amenable for separation from the crude oil. The liquid water is then separated from the crude oil where the water contains the salt dissolved therein. The process is particularly characterized in that it does not include imposing high shear mixing of the uncondensed steam bubbles and wherein the steam is injected in a hydrocyclone steam-crude mixing zone where crude oil flows through a tangential inlet of the steam-crude zone to create a vortex flow while the steam is injected into the axis of rotation of the crude oil and stirred into the flow so that the steam bubbles are caused to collide with many elements of the crude oil.

The invention more particularly relates to a process for removing salt from crude oil wherein the salt may be in the form of particles of crystalline salt suspended in the crude oil or as small droplets of brine water suspended in the crude oil, or both. The process includes injecting steam into the crude oil in the form of steam bubbles that are quite large relative to any salt particles or relative to the any small droplets of brine water so as to contact the steam bubbles with the crude oil along with any nearby suspended salt particles and brine droplets, such that a single steam bubble may actually contact a number of salt particles and brine droplets. The steam bubbles are condensed into droplets of liquid water while at the same time dissolving available salt particles forming new brine droplets and also delivering a portion of the water, whether liquid or vapor, within steam bubbles into any available small brine droplets resulting in enlarged brine droplets having a size more amenable for separation from the crude oil. The liquid water is then separated from the crude oil where the removed water includes the salt dissolved therein. The process is particularly characterized in that it does not include imposing high shear mixing of the injected steam bubbles with the crude oil and wherein the step of injecting the steam occurs in a steam-crude mixing zone where the steam is injected through an interface between two objects which are spring biased toward each other.

The invention more particularly relates to a process for removing salt from crude oil wherein the salt may be in the form of particles of crystalline salt suspended in the crude oil or as small droplets of brine water suspended in the crude oil, or both. The process includes injecting steam into the crude oil in the form of steam bubbles that are quite large relative to any salt particles or relative to the any small droplets of brine water so as to contact the steam bubbles with the crude oil along with any nearby suspended salt particles and brine droplets, such that a single steam bubble may actually contact a number salt particles and brine droplets. A gas is injected into crude oil with the steam bubbles therein to stir the crude oil and steam bubbles while the steam bubbles are condensing into droplets of liquid water. While the steam bubbles are condensing they are contacting and dissolving available salt particles creating new brine droplets and also delivering a portion of the water, whether liquid or vapor, within steam bubbles into any available small brine droplets resulting in enlarged brine droplets having a size more amenable for separation from the crude oil. The gas is separated from the crude oil after the steam bubbles have condensed and collapsed and thereafter the liquid water is separated from the crude oil where the water takes the salt dissolved therein with it leaving desalted crude oil. The process is particularly characterized in that it does not include imposing high shear mixing of the steam bubbles with the crude oil to increase contact between steam and the suspended salt.

The invention more particularly relates to a process for removing salt from crude oil wherein the salt may be in the form of particles of crystalline salt suspended in the crude oil or as small droplets of brine water suspended in the crude oil, or both. The process comprises injecting steam into the crude oil in the form of steam bubbles that are quite large relative to any salt particles or relative to any small droplets of brine water so as to create steam bubbles that will have substantial contact with the crude oil along with any nearby suspended salt particles and brine droplets, such that a single steam bubble may contact numerous salt particles and brine droplets. A chemical demulsifier is added to the crude oil and a light gas is injected into the crude oil with the steam bubbles to stir the steam bubbles with the crude oil. The crude oil with the steam bubbles, chemical demulsifier and light gas is directed into a vertical flow chamber where the steam bubbles condense into droplets of liquid water in the vertical flow chamber while at the same time dissolving available salt particles and also delivering a portion of the water, whether liquid or vapor, within steam bubbles into any available small brine droplets resulting in new brine droplets and/or enlarged brine droplets having a size more amenable for separation from the crude oil. The light gas is separated the from the crude oil after the steam bubbles have condensed and collapsed and the water droplets are coalesced in a static coalescer mixer before the liquid water is separated from the crude oil. The liquid water includes the salt dissolved therein. It should be noted that the process is particularly characterized in that it does not include imposing high shear mixing of uncondensed steam bubbles within the crude oil to increase contact between injected steam or water and the suspended salt.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
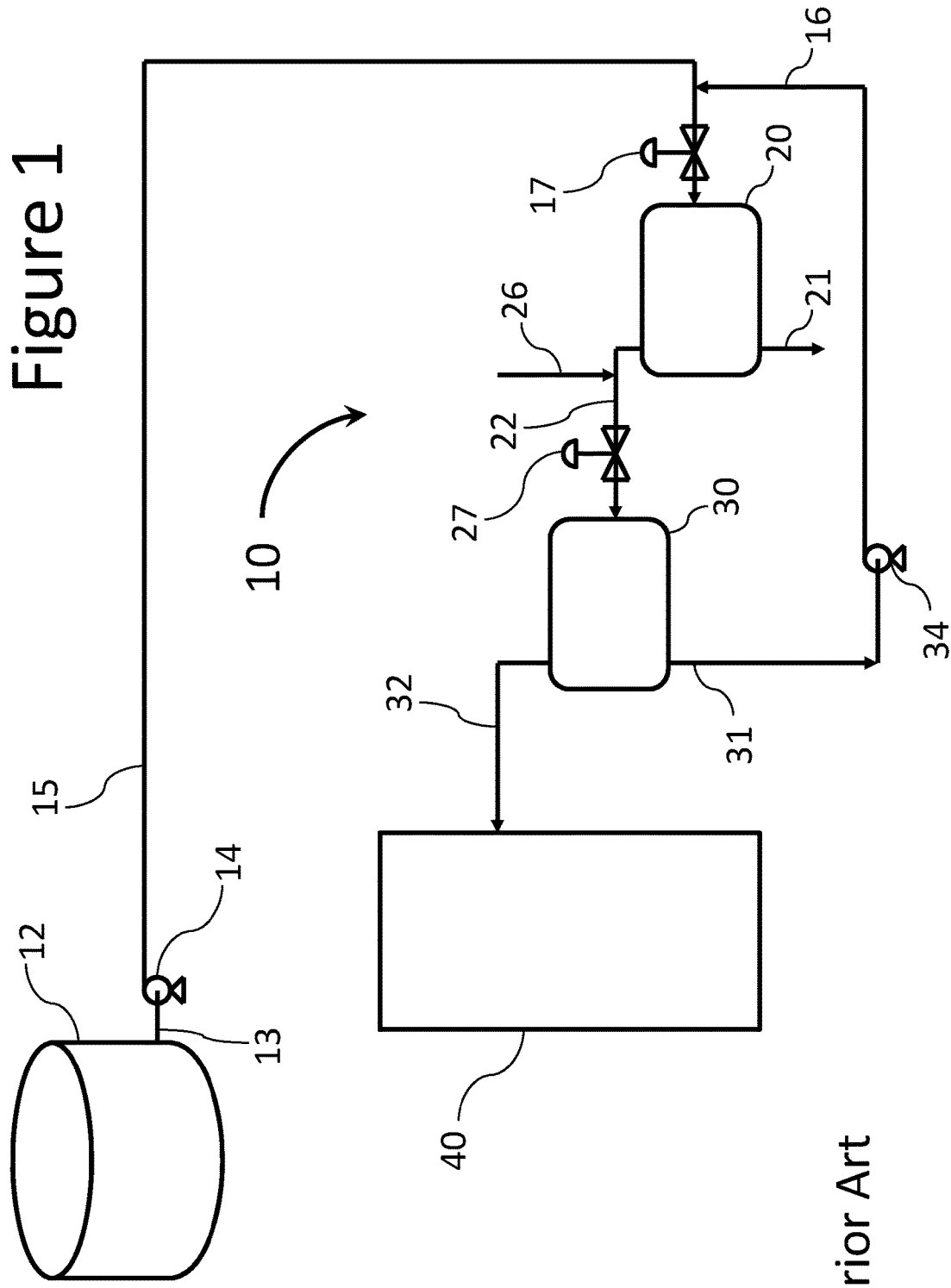
FIG. 1 is schematic view of a conventional prior art system for supplying crude oil into a refinery including a crude oil storage tank remote from the primary operational portion of a refinery, a prior art desalting system and a charge pump and supply line to carry the crude oil from the charge pump to the desalting system.

Referring to FIG. 1, a prior art desalter system 10 is shown for removing salt from crude oil being brought in from crude oil storage facilities and delivered to the operational portion of a refinery. For illustration purposes, the crude oil is shown to be stored in a large storage tank 12. Crude oil is drained from a lower portion of the tank 12 through a line 13 an fed to a charge pump 14 which directs the crude oil from the storage facilities through a conduit 15 and ultimately to a first refining vessel 40 in a refinery. As noted above, crude oils with different characteristics are conventionally blended in preparation for refining which can occur in a blend tank similar to tank 12 or by delivering crude from a number of storage tanks similar to tank 12 into a common pipe for in-line blending. This is all typically done in the tank farm which is usually quite some distance from the operational portion of the refinery. The crude is typically heated by various different known means as it passes to vessel 40. The first vessel 40 is likely to be a furnace for a fractionation tower where crude oil is heated and then separated into its fractions based on differing boiling temperatures of each of the fractions.

Focusing now on the desalter system 10, it is desired to remove salt from the crude to reduce fouling in the refinery and corrosion to the various units in the refinery including the first refining vessel 40. To remove salt and contaminants, it is conventional to inject water (about 2% to 10% by weight, water to crude) into the crude oil flowing through conduit 15 via the first water feedline 16. Water being injected into the crude oil via the first water feedline 16 creates reasonably large droplets of water in the crude oil as the water is immiscible in crude. To enhance salt transfer into the injected water, the water and crude oil are passed through a high shear mix valve 17 that aggressively mixes the water with the crude shearing the larger droplets into much smaller water droplets. The smaller droplets have a much higher surface area than the larger droplets to create a very high contact area with the salt in the crude oil, and the turbulence associated with the mixing creates high velocity collisions between the water droplets and salt in the crude oil. These two actions get the water to quickly accumulate salt, but this is only the first function of the desalter. The desalter needs to separate as much water as possible removed back out of the crude oil, including the now salty water so that the crude oil may move on to be refined without compromising the operations of systems within the refinery. Appreciable water in the crude oil causes numerous complications and challenges for a number of systems and must be removed down to a very low concentration. To remove the water droplets from the desalted crude oil, the mixture is directed into a settling tank 20 where the crude oil rises and the water droplets settle. These tanks tend to be quite large themselves to allow time and space for the water droplets to settle to the bottom where it is removed at drain 21 while the now cleaner crude is removed via line 22.

Continuing with the description of a conventional prior art desalter system 10, it is common to use two successive stages. In the second stage, the somewhat desalted crude oil again receives a minimal water injection via second injection feedline 26, aggressive high shear mixing across the mix valve 27 and a second stage of settling in the second settling tank 30. From the second settling tank 30, water exits via drain 31 which may have only captured a small amount of salt from the crude oil in the second stage so may be recycled to feed the first water feedline 16. The twice desalted crude exits the second settling vessel 30 via line 32 which is then delivered to the first refinery unit 40.

It is conventional in crude oil desalter systems like the one shown in FIG. 1 to create rather stable emulsions of crude oil and water within the settling tanks 20 and 30. As such, it is common practice to add emulsion breakers to the crude oil to reduce the volume of emulsion and enhance the separation of water (including salty water) from the crude oil. In the present invention, performing some or all of the salt transfer from the crude oil into steam versus into liquid water has shown remarkable advantages for desalting crude oil and, when implemented in an advantageous arrangement, may significantly reduce the production of stable emulsions. This means that water is less likely to be bound up with the crude oil in a manner in which the crude oil is not suitable for refining. And while it is necessary to keep water from going into the refinery, it is also very important to keep hydrocarbons from going out with the water as hydrocarbons tend to be toxic to the microorganisms in waste water treatment operations.

A comparison of salt transfer into steam versus into water was performed recognizing that there are a number of variables that are present in each arrangement that are not present in the other. Using a laboratory scale steam injector with a sample of crude oil having a known salt content, measurements were undertaken of the droplets of water formed by the condensing and collapsing steam bubbles. Using the size of the droplets that were measured, water was added to another sample of the same crude oil and the high shear mix valve was adjusted to create droplets of the same size. Both systems were fed the same emulsion breaker, had the same temperature entering the settling tank and the measured salt transfer for steam droplets was measured to capture 95% of the salt content while the comparable water droplets captured 66% of the salt content. While this is appealing, it should also be appreciated that a steam desalter at its optimal operating settings may produce a larger water droplet size while still capturing a higher percentage of the salt thus making the water easier to separate from the crude oil where each component has less content of the other at the outlet from the gravity separation vessel. And there are a number of ways that this may be implemented.

Figure 2:
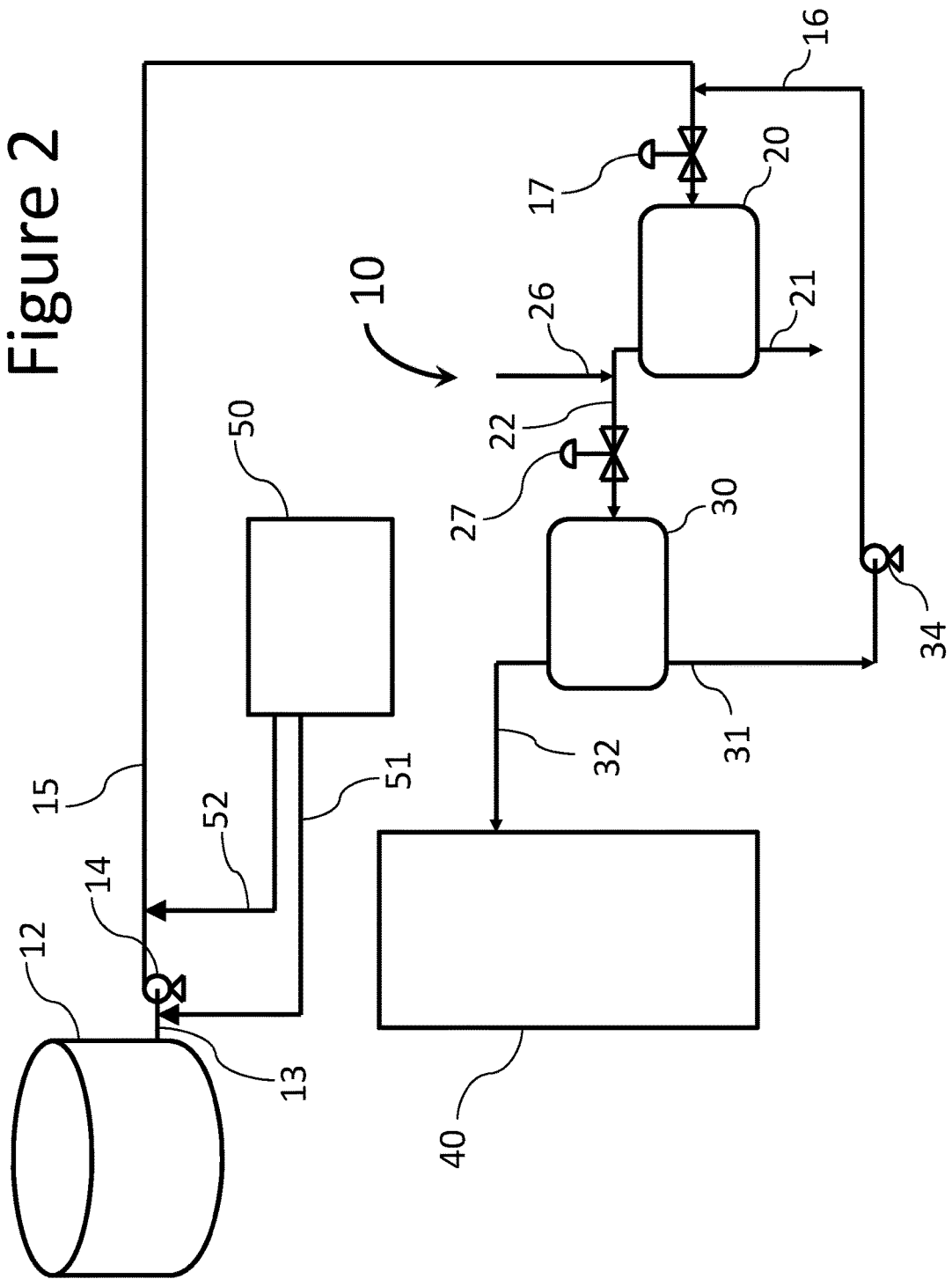
FIG. 2 is schematic view similar to FIG. 1 showing a first aspect of the present invention relating to adding steam to crude oil at or near the storage tank that is well upstream of the desalting system to heat the crude oil and reduce viscosity and drag for moving the crude oil into the operational portion of the refinery and to aid in removing salt and other contaminants from the crude oil when it gets to the desalting system.

In a first implementation of the present invention, it is shown as an improvement to a conventional system such as the one shown in FIG. 1. So, referring now to FIG. 2, water in the form of steam may be added to the crude not in the desalter system 10, but rather well away from the desalter system 10. Since steam will heat the crude oil while also capturing salt, the heat value of the steam may be used to reduce the effective viscosity of the crude oil. A reduced viscosity reduces the resistance to flow in the conduit 15 coming from the storage vessel 12. So, as shown in FIG. 2, a steam production system 50 is shown to provide steam at one or more selected locations between the crude tank 12 and the desalter system 10. Steam is often available in refineries, but for purposes of explanation, a steam production system 50 creates steam and is installed to deliver the steam to the location or locations desired. Considering the options, the earlier the steam is provided to the crude, the easier it is to move the crude though the piping. However, it should be recognized that delivering steam into a tank farm that is probably quite some distance from the steam production system and the desalter will present some logistical challenges. As such, the delivery of steam at a great distance may be limited or impractical, but even if added to the steam half way to the desalter could reduce friction over that distance and may make the lower viscosity of heated crude valuable enough to justify the engineering and construction to get steam out to a midway point. So, as shown by arrow 51, the steam may be delivered to the crude oil coming from the crude tank into line 13 upstream of the charge pump 14. Having the steam injected at this point reduces the work load on the charge pump 14 as pumping lower viscosity crude oil does not require the same amount of energy to deliver the same volume of crude to the same location at the other end of the conduit 15. The steam should capture some salt into the condensing steam (water) and be separated from the crude oil in the desalting system 10.

It should be noted that refineries and most industrial systems are designed to use high pressure and high temperature steam in various processes, but once the steam is cooled and obtains a lower pressure downstream of the processes for which the steam system is designed, it is often termed waste heat or waste steam. This invention may actually provide a really good use of such low value steam regardless of how much value it can deliver to a refinery by more effectively and more efficiently removing salt and contaminants that are troublesome in numerous places within refinery systems.

Even if the steam is injected downstream of the pump but within the conduit 15 out in or near the tank farm (including and in the vicinity of tank 12) as shown by arrow 52, the friction created by the crude oil in conduit 15 is reduced. As such, the charge pump 14 would still require less energy to deliver the same amount of crude to the desalter system 10.

Figure 3:
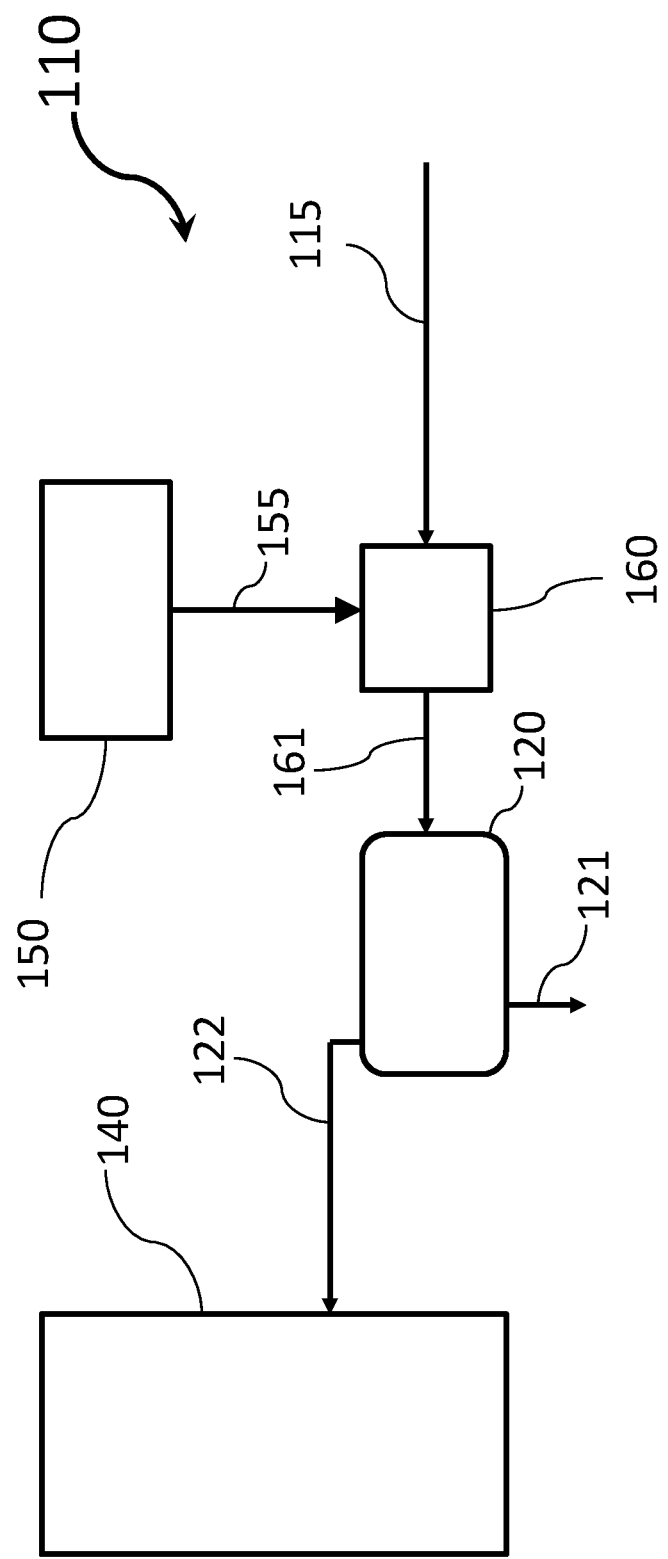
FIG. 3 is schematic design showing a second aspect of the present invention comprising a steam desalting system.

Turning now to FIG. 3, a simplified system 110 is shown to remove salt utilizing one of the principle tenets of the invention and that being using stream bubbles to contact and transfer salt suspended in crude oil rather than liquid water. Expanding on this point, it is believed that the mechanism for water droplet growth and especially growth of exceptionally small brine water droplets occurs differently for steam than for water. In a conventional water washing system, the water content of the crude oil coming into the desalter is generally less than about 0.2 percent by weight water to oil. It is also believed that most of the salt is bound up within this small water content in the form of remarkably small water droplets that are generally less than a micron in diameter. These salt bearing microdroplets or brine water droplets tend to include a relatively thick and hardened hydrocarbon coating or shell surrounding the droplet. This hardened coating is formed of high molecular weight large hydrocarbon molecules like asphaltenes that generally seal off the micro sized brine water droplets from other water droplets.

It is believed that current techniques for removing salt dispersed in crude oil are successful are because of high velocity collisions between water droplets and micro brine water droplets that crack or penetrate any fissures in the coating that results in a larger brine droplet that effectively sheds away any remaining portions of the brittle shell or coating. So, this process requires significant kinetic energy to remove salt, but also must use a minimal volume of water recognizing that residual water in the crude oil after the crude oil has been desalted is also a problem in the refinery. As such, it is typical to limit the amount of water added to the crude in a desalting operation to about 5% to 10% by weight water to crude oil. In using steam, the same upper limits probably apply on a weight basis, but it is expected that the lowest amount of water in whatever physical state will be used to effectively remove the optimum amount of salt. It is believed that a range of about 1% to 8% is the most likely range, but less than about 6% is most likely to be used. Substituting in the maximum volume of steam to replace liquid water as practical given temperature limits to heating the crude seems most optimal and getting at least 2% steam by volume is desirable and better yet, at least 4% steam by weight of the crude oil is the most desirable.

The high kinetic energy is created by aggressive mixing in a high shear mixer. As the wash water is added, it gets shredded into droplets of between 20 to about 40 microns in size. Due to the small size of the brine droplets, they are not shredded in the same way by the high shear mixing or even so much as peel the shell or coating off these small salt containing droplets. But the aggressive high shear mixing causes the wash water droplets and brine droplets to undergo violent and turbulent collisions within the crude oil that is able to at least begin the process of removing the shell and growing the microdroplets into droplets of a size more amenable to separation. Once a micro brine droplet has coalesced with a wash water droplet and attained a larger size, it is then more available for coalescing with other water droplets. However, any micro brine droplet with a coating still intact is much less likely to coalesce with other droplets downstream of the violent turbulence of the high shear mixer. Steam bubbles do not seem to need this high velocity collision with a brine microdroplet to coalesce or grow the microdroplet.

There are a number of factors that increase or reduce the probability of two water droplets to coalesce including temperature, droplet size, relative velocity and the viscosity of the medium. The interfacial tension within each droplet can also resist coalescing, especially for really small droplets. The existence and integrity of hydrocarbon shells really reduces the likelihood of brine droplets from coalescing with droplets of wash water droplets without some force or action to penetrate or compromise the shell.

Steam bubbles seem to grow brine microdroplets by both heating and by more broadly surrounding or contacting brine microdroplets. Vaporous water molecules in steam are able to penetrate through fissures in the hard coating described above that may be inherent or may be enlarged by being heated. Moreover, with the substantial size of steam bubbles and the more amorphous and pliable outer surface of a steam bubble compared to a water droplet, more of the surface area and more fissures of each brine microdroplet is exposed to and contacted by the steam bubble for absorbing or accreting water (whether vapor or liquid) into and growing the microdroplets. An enlarged microdroplet thereafter will have larger fissures for the steam bubble to more rapidly deliver steam and water into the microdroplets further compromising any seal on the microdroplet of the hydrocarbon shell.

It is worth noting that a single bubble of steam may contact many microdroplets due to the fact that even a small steam bubble of a few millimeters in diameter is profoundly larger than a microdroplet. And, it is more likely that steam bubbles will have a maximum size that is larger than a few millimeters. Ideally, the steam bubbles will have an initial size of a half centimeter up to tens of centimeters in diameter. However, measuring steam bubbles size is quite a challenge as each steam bubble first quickly expands and then quickly shrinks by condensation as it cools from its first contact with the crude oil and whatever is suspended in the crude oil. Observations suggest the steam bubbles are fully condensed in well less than a full second after first emanating from the steam delivery system into a water droplet having about one thousandth of the volume of a steam bubble. Typically, a steam bubble condenses to a single water droplet, but as the steam droplet contacts hydrophilic elements in the crude oil (crude oil is well known to be hydrophobic) such as crystalline salt and other droplets of water, some of the water content of the steam bubble is released to or contributed to or transferred to those elements. A steam bubble may actually coalesce with one or several of these elements such that a separate and individual water droplet from that steam bubble may not be created. The fewer (and therefore larger) water droplets created suggest a higher rate of removal of water from the crude oil in the gravity separator, which is highly desired.

It is noted that not only may one steam bubble likely grow multiple droplets, but that a single brine droplet may also grow pursuant to contacts with a number of different steam bubbles. The result is larger droplets with much diminished coatings that are more amenable to gravity separation, not only on their own, but these enlarged and unsealed droplets are also more amenable to gravity separation by additional and subsequent coalescing with other droplets in the system.

Returning now to FIG. 3, a most simplified version of the invention showing that that liquid water is not provided into the desalting system 110. Water, only in the form of steam is provided. A steam production system 150 provides steam through a steam delivery system 155 to a steam-crude mixing zone 160 which may be a vessel or chamber or the like, but may be a portion of a pipe. The steam-crude mixing zone 160 may simply be a portion of the conduit or pipe 115 via which crude is delivered to the desalting system 110 on the way to the first refining vessel 140 in the refinery or it may be a vessel designed to permit the steam bubbles to yield their heat to the crude oil and fully condense. The steam-crude mixing zone 160 may take other forms as will be explained below. Within the steam-crude mixing zone 160, all of the steam bubbles are intended to be condensed and collapsed into liquid water droplets and then delivered by line 161 into gravity separator 120. Gravity separators are conventional for desalter systems where the water sinks to the bottom and is released to waste water treatment via drain 121 while crude exits at the top of the separator via line 122 to be carried into first refining vessel 140.

Since steam is more amenable to coalescing with microdroplets of brine, creating high velocity collisions is not as necessary. As such, as shown in FIG. 3, steam is injected, but there is no high shear mixing valve. The steam is injected into the crude oil conduit 115 in a variety of arrangements with the intention of creating an army of steam bubbles to capture salt and also to increase the temperature of the crude oil to an optimum temperature for operation of the gravity separator 120. By rule of thumb but within limits, warmer crude oil is less viscous and water should separate from warmer crude by settling at a faster rate. There are perceived optimum temperatures at which a gravity separator is to operate and there are a number of conventional methods to get the crude oil to that temperature. A lot of effort and planning goes into heat management within a refinery and using heat exchangers to heat the crude oil is conventional. As such, in accordance with the invention, the steam injection shown in FIG. 3 would be expected to operate in a manner that optimizes the temperature of the crude oil and water mix going into separator 120. Moreover, while gravity separation is preferred, other density based separation technologies are within the scope of the invention.

Figure 4:
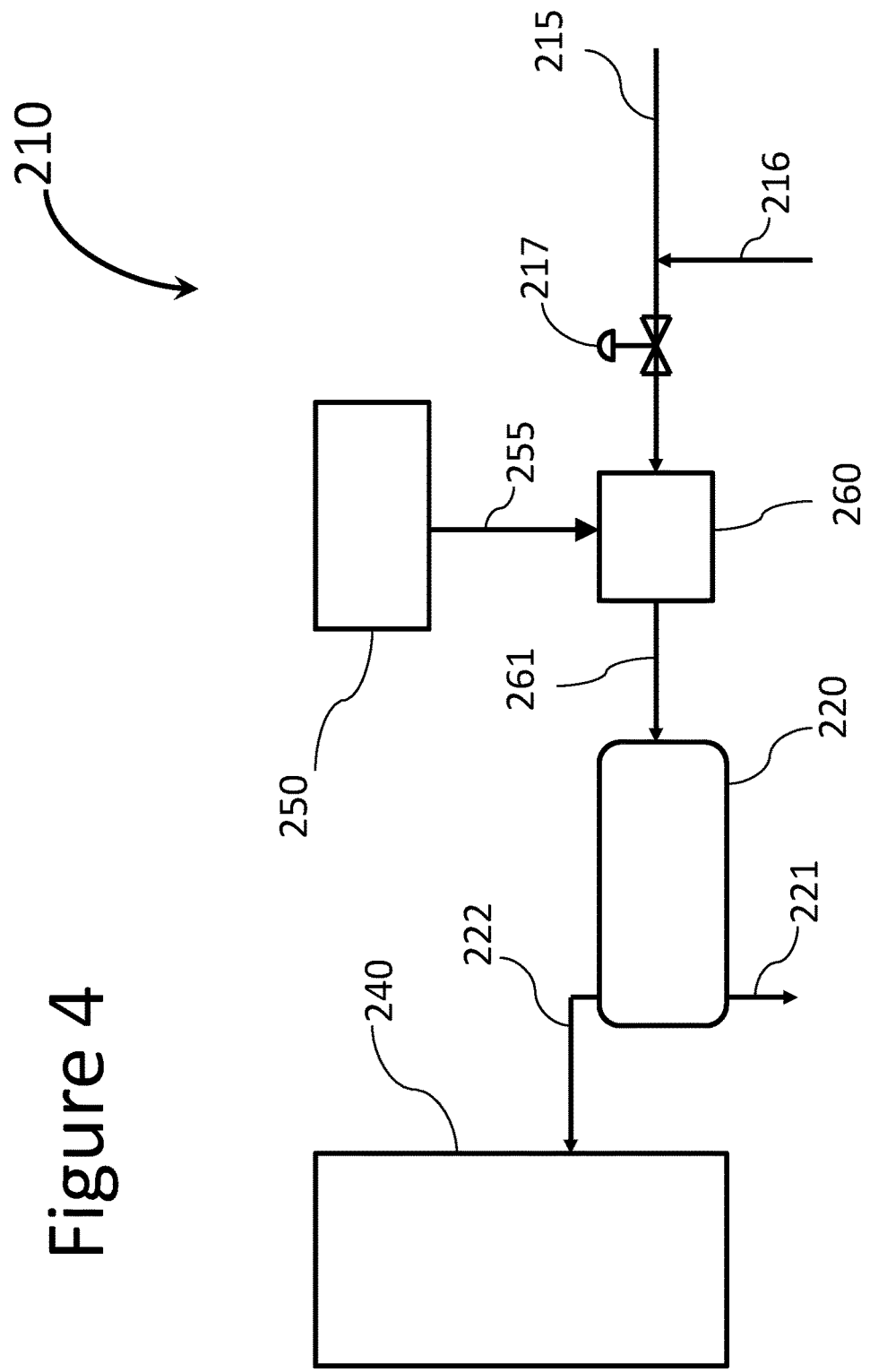
FIG. 4 is a schematic view of a second embodiment of the steam desalting invention where the crude oil is first subjected to water injection and aggressive high shear mixing prior to injection of steam.

Recognizing that in some refineries, an unlimited volume of steam may not be added to the crude oil as the crude could exceed the desired temperature range, FIG. 4 shows an arrangement that employs an injection of steam, but also utilizes some level of conventional water washing of the crude oil. In this arrangement, water is added first to the crude oil conduit 215 via water feedline 216. The wash water and crude oil undertake aggressive high shear mixing at high shear mix valve 217. After the aggressive high shear mixing, steam from steam production system 250 delivers steam into steam-crude mixing zone 260 via steam injection system 255. As with the embodiment shown in FIG. 3, all of the steam bubbles are allowed to fully condense before the crude oil and water is taken into gravity separation tank 220. In this arrangement, the steam bubbles tend not only to capture crystalline salt and grow the microdroplets of brine water, but also coalesces or feeds water into any of the salty water droplets created by the wash water droplets whether they have pulled brine droplets into them or not. Either way, the steam bubbles help render the water more amenable for gravity separation. Again, like in the previous embodiment, salty water exits the gravity separator 220 via drain 221 while desalted crude oil exits through line 222 to be taken into the first refining vessel 240.

Figure 5:
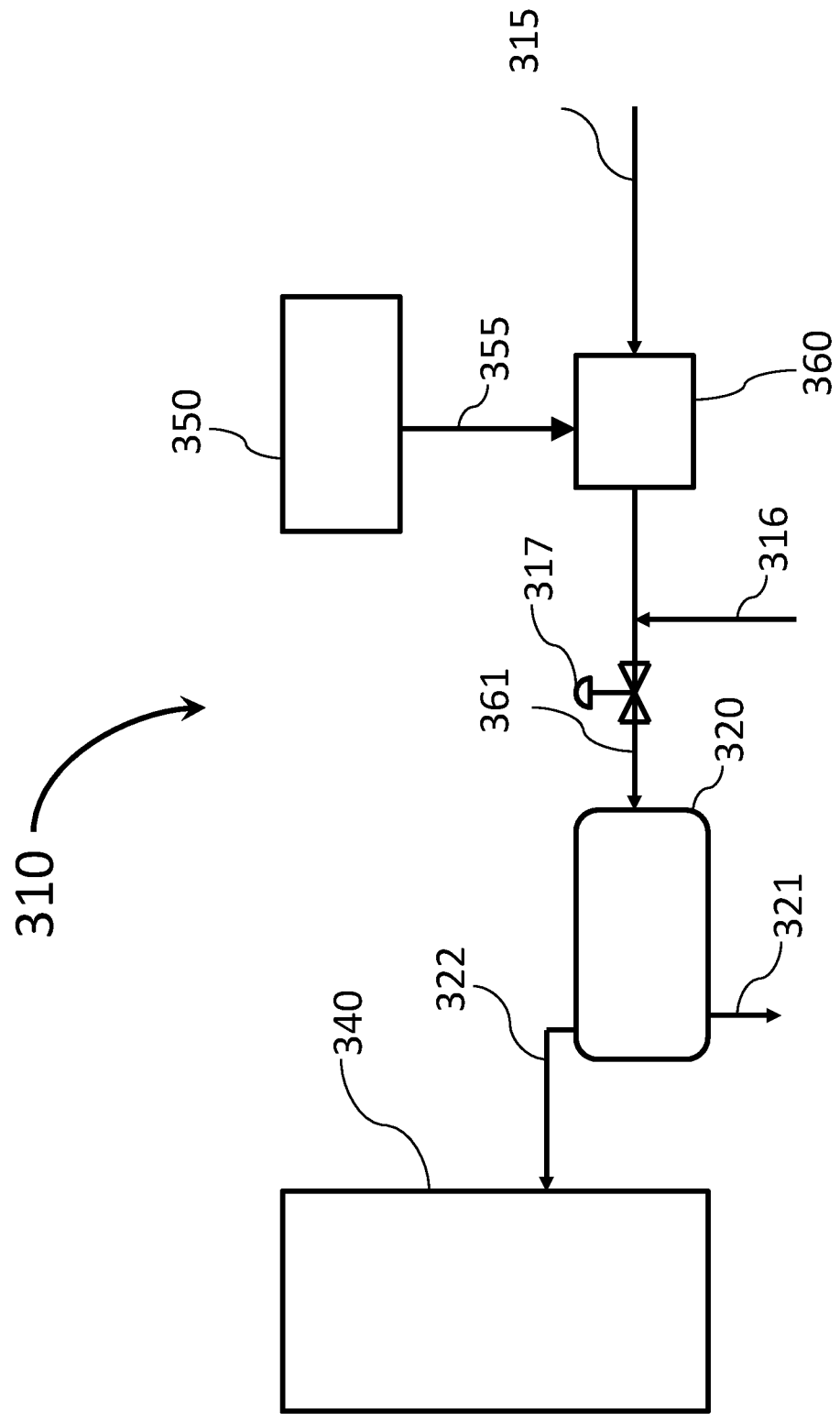
FIG. 5 is a schematic view of a third embodiment of the steam desalting invention where the crude oil receives water and aggressive high shear mixing, but is first subjected to steam where the steam is allowed to condense and the steam bubbles to fully collapse before the aggressive high shear mixing.

In a simple alternative to the embodiment shown in FIG. 4, the next embodiment is shown in FIG. 5 where the desalting system 310 provides the steam addition first from steam production system 350. Steam bubbles are added to the crude oil in steam-crude mixing zone 360 via steam injection system 355. The crude oil is heated by the steam addition while the steam grows the microdroplets of brine water and condenses into water droplets. Additional water is added after the steam has fully (or nearly fully) condensed via wash water feedline 316. The crude oil with the wash water, water droplets from condensed steam and enlarged brine droplets then goes through the high shear mixing valve 317 to create the high energy collisions between water droplets and brine droplets to grow the brine droplets. The mixture of crude oil and water and salt is then gravity separated in gravity separator 320 where salty water is drained via drain 321 while the desalted crude oil exits through line 322 to proceed to the first refining vessel 340. In this arrangement, an interesting benefit may occur even for microdroplets of brine where the steam may soften or thin the hydrocarbon shell or coating on the microdroplets of brine making them more vulnerable in high shear mixing. As such, the conventional portion of this arrangement may actually become more efficient at coalescing with brine droplets with some thickness of the coating intact after the steam-crude mixing zone 360.

Turning to more complicated arrangements of the present invention, it is noted that in many refineries, multiple stages of desalting occur. The present invention includes arrangements to take advantage of a second opportunity to remove salt and provide the refinery with considerably lower salt content. Before describing a multiple stage system, it should be understood that steam really does provide an advantaged system for capturing salt. Comparative tests are not easy to set up to do apples for apples comparisons. With a view toward trying to create as close to apples to apples comparisons, a test system was set up for injecting steam into a stream of crude oil with known salt containing properties. A similar system using wash water and a high shear mix valve was also set up. The water droplets emanating from steam injection were measured just downstream from the steam-crude mixing zone and found to be about 80 microns. The mix valve for the wash water system was adjusted until consistent measurements of the water droplets downstream of the mix valve also measured about 80 microns. The same crude oil was run in each system at the same rate with equal amounts of a known and conventional emulsion breaker. The sample of crude oil having been steam desalted was found to have about 5% of the original salt content remaining in the crude oil after one pass. The sample of the same crude having been subjected to the wash water and high shear mixing was found to have about 34% of the original salt content under the pertinent operating conditions. However, it should be pointed out that while this was an attempt to create apples to apples data, this does not suggest that this is a comparison of optimal to optimal arrangements. It may be that more salt may be removed from the crude oil if the mix valve is set at a more aggressive setting creating smaller wash water droplets and more violent turbulence. That may include a concern about removing salt at the expense of higher water content in the crude going into the refinery. It also does not suggest that the steam injection used for this comparative test was optimal either. But, the comparison does clearly suggest that considerable advantage may be obtained by properly injecting steam into crude oil for desalting purposes.

Figure 6:
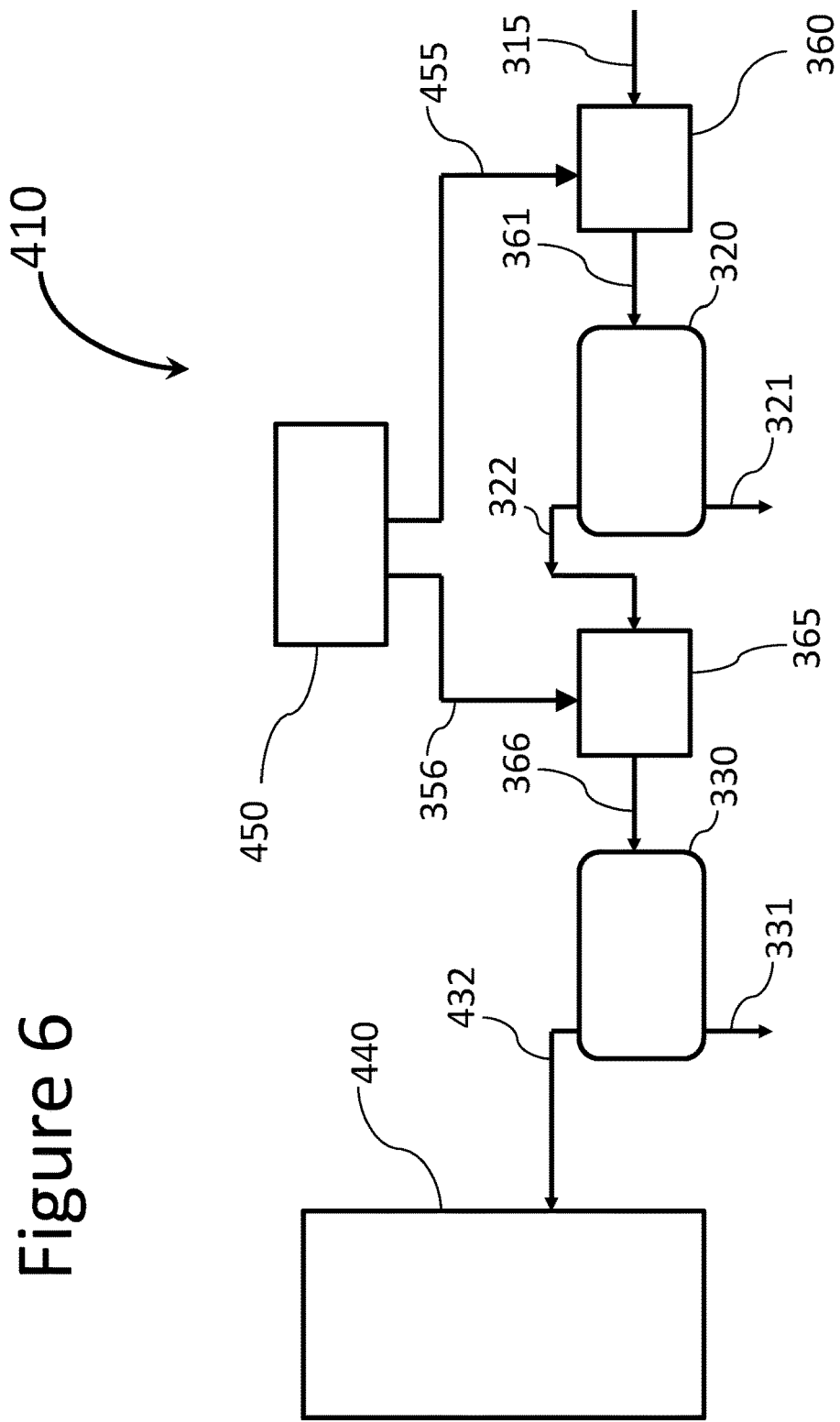
FIG. 6 is a schematic view of a fourth embodiment of the steam desalting invention where the crude oil is subject to two desalting stages where each stage is accomplished using steam and no aggressive high shear mixing.

Turning back to the embodiment of the present invention shown in FIG. 6, the crude oil is subjected to two stages of steam injection where each stage includes gravity separation. While additional steam may be injected from additional injection systems, it is considered a single stage if all the steam is allowed to condense and then the water and crude oil are separated.

In this arrangement, the desalter system 410 comprises a crude oil conduit 315 delivering crude oil into first steam-crude mixing zone 360 where the steam bubbles heat the crude and do their work making the salt more amenable to removal at the first gravity separator 320. Steam is provided from the steam production system 450 and delivered to the first stage via steam injection line 455. Salty water is drained from the gravity separator 320 by drain 321 while crude oil that may be characterized as first pass desalted crude oil passes out of the first gravity separator 320 via line 322 and passed to the second steam-crude mixing zone 365. The first pass desalted crude is again subjected to steam which both heats the crude oil and renders more of the residual salt content amenable to gravity separation. Like the other embodiments the mix of crude oil and salty water are gravity separated in second stage gravity separator 330 where salty water is drained at drain 331 while the second pass desalted crude oil is passed on to the first refinery vessel 440.

Figure 7:
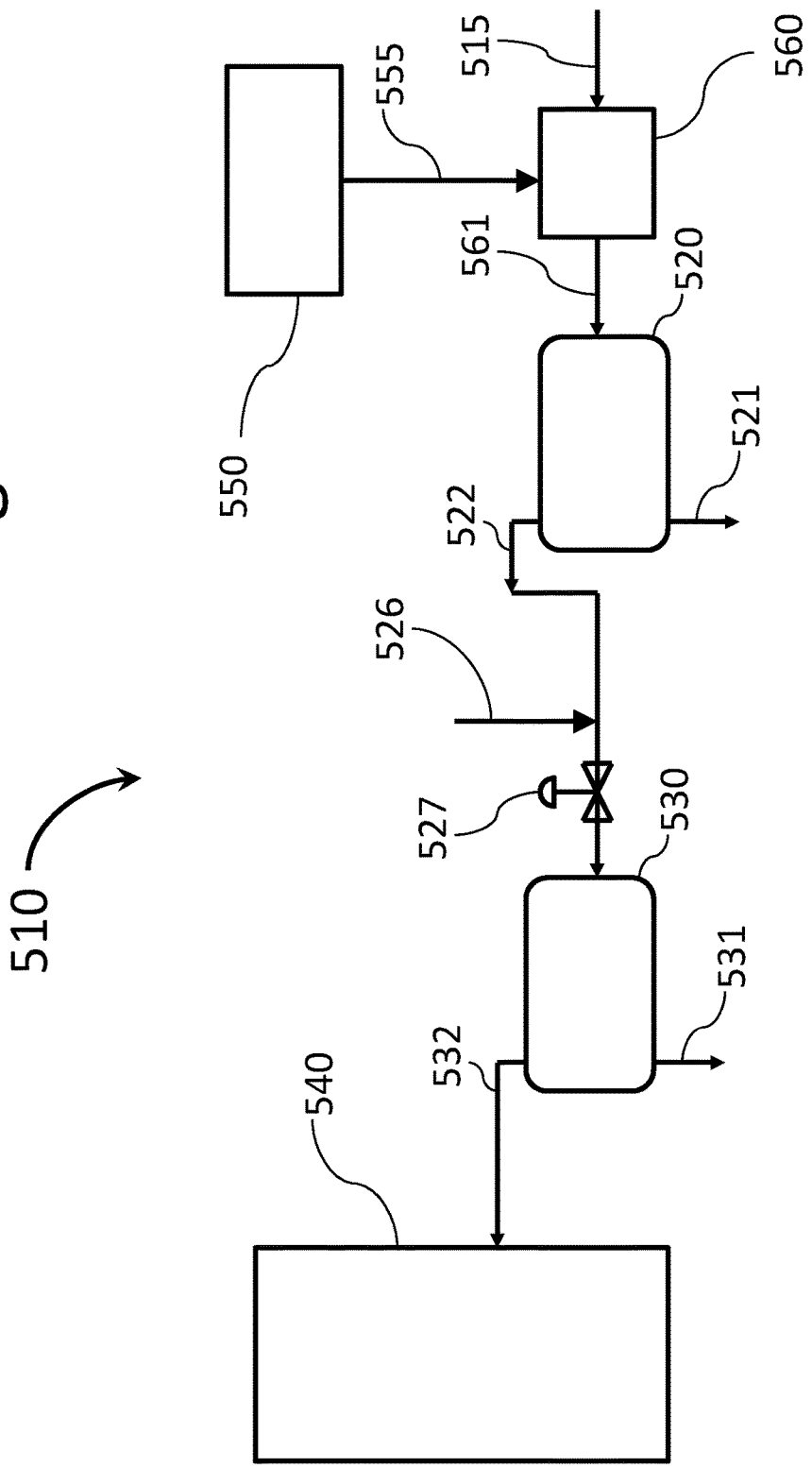
FIG. 7 is a schematic view of a fifth embodiment of the steam desalting invention where the crude oil is subject to two desalting stages and the first stage is accomplished using steam and no aggressive high shear mixing and the second stage includes water injection and aggressive high shear mixing.

It should be recognized that two stages of steam may overheat the crude oil relative to optimal temperature of the gravity separators so another embodiment of the present invention is envisioned where wash water is used in the second stage assuming that the crude oil will retain much of its heat from the first stage. So, in the embodiment shown in FIG. 7, the desalting system 510 includes a steam production system 550, a steam delivery line 555 provides steam to the steam-crude mixing zone to follow a process similar to that which has been previously described. The first pass desalted crude oil is then subjected to conventional wash water desalting to remove residual salt. It should be noted that the conventional wash water desalting may be optimally operated to create a different size water droplets considering the effectiveness of salt removal in the first stage and the desire not to leave much water in the crude oil entering the refinery. Small water droplets tend to be harder to separate in the gravity separator and with the view that only a small residual amount of salt remains, the mixing might be a little less aggressive than in other installations.

Figure 8:
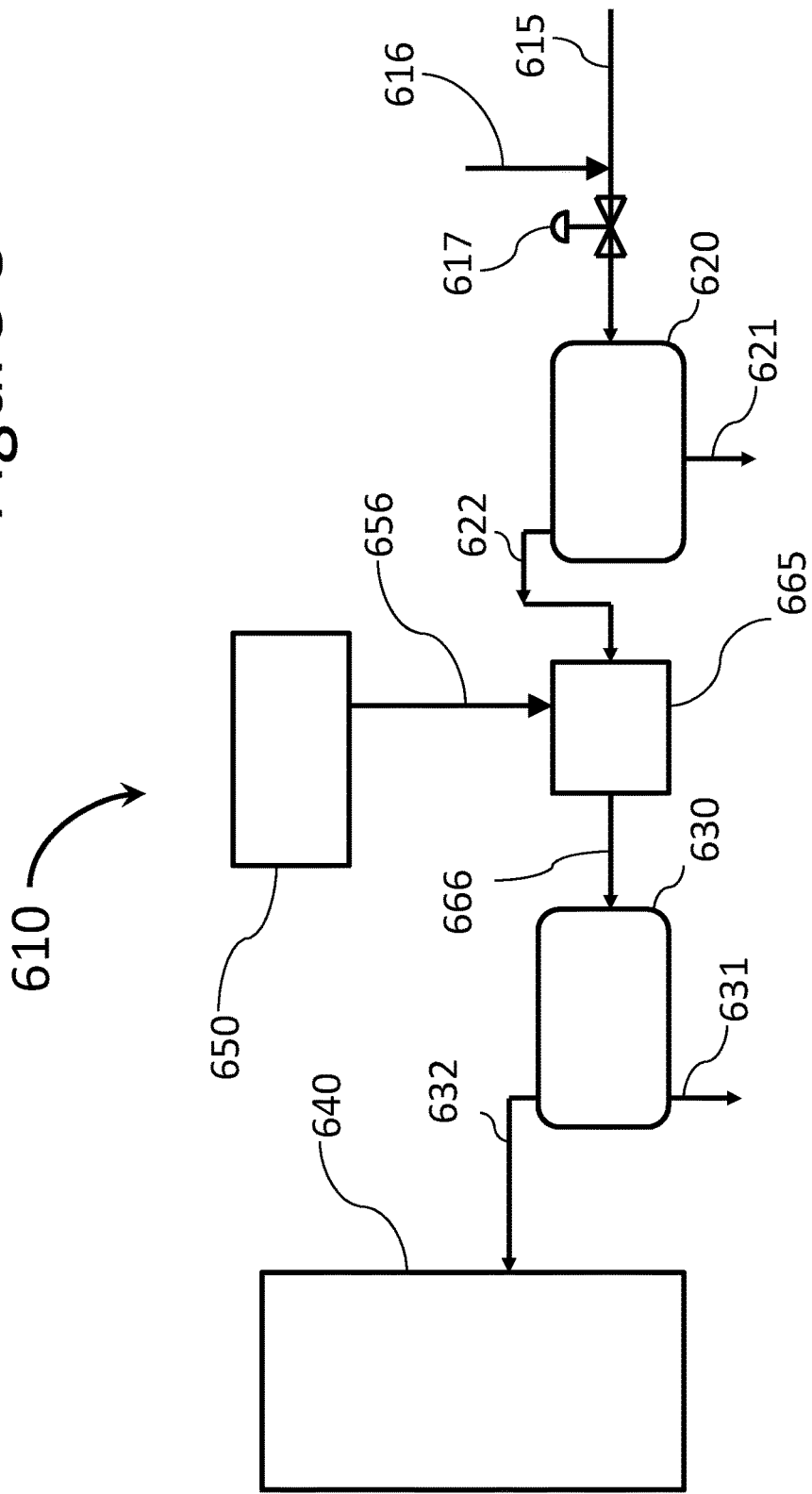
FIG. 8 is a schematic view of a sixth embodiment of the steam desalting invention where the crude oil is subject to two desalting stages and the first stage is accomplished using injected water and aggressive shear mixing while the second stage is accomplished with steam and no aggressive high shear mixing.

Recognizing that a refinery may already have two stages of desalting, but a limited temperature tolerance for converting all of the desalting water to steam desalting may suggest leaving the wash water desalting in the first stage as shown in FIG. 8 where the system 610 includes a wash water feedline 616 and high shear mixer 617. Knowing that steam will be used in a second stage that is able to coalesce with small droplets of wash water, a refinery operator may set the first stage high shear mix valve to an extra aggressive setting. While the average droplet size might be smaller going into the first stage gravity separator 620, the water content of the first pass desalted crude oil will be reduced by gravity separation and the steam will be most effectively used to coalesce with all of the water droplets whether salty or otherwise. Again, the water is removed by gravity separation in second stage gravity separator 630 before the twice desalted crude oil is delivered to the first refinery vessel 640. It should also be noted that gravity separation is the conventional technique for separating water from oil, but other techniques for separating water from oil would also be useful and not outside the scope of the present invention.

Gravity separation vessels tend to be rather large. While they are insulated, it is conceivable that heat may be lost and the temperature may be restored in a second stage by additional steam. In another embodiment shown in FIG. 9 where the desalting system 710 is arranged to take advantage of an opportunity to further inject steam to most effectively desalt the crude oil, steam is injected to the crude oil arriving from the tank farm via crude oil conduit 715 at steam-crude mixing zone 760. After all or virtually all of the steam bubbles (preferably all) have condensed, the wash water is added by wash water feedline 716 and the mixture is subjected to aggressive high shear mixing in high shear mixer 717. Water is removed by gravity separator 720 and additional steam is added at the second stage steam-crude mixing zone. It is again noted that with the steam injection downstream of the high shear mix valve 717, the setting of the high shear mixer 717 may be set to a more aggressive setting than in a conventional desalter system recognizing that the steam addition in the second stage is there to provide additional coalescence to the water droplets in the crude oil making the second stage gravity separator 730 more effective from removing water droplets that were sheared to a smaller size.

Figure 9:
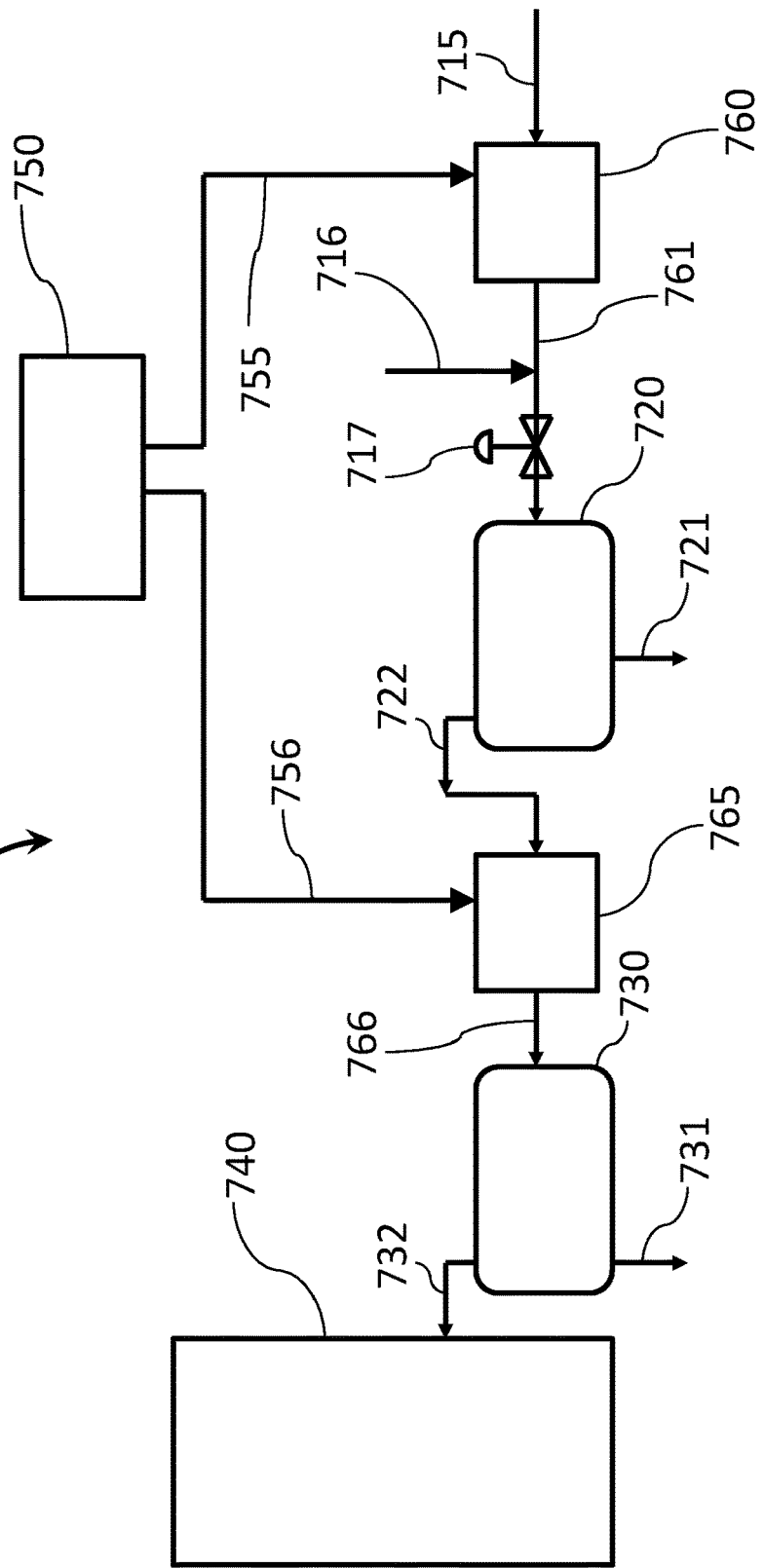
FIG. 9 is a schematic view of a seventh embodiment of the steam desalting invention where the crude oil is subjected to two desalting stages and receives water and aggressive high shear mixing in the first stage, but is first subjected to steam where the steam is allowed to condense and the steam bubbles to fully collapse before the aggressive high shear mixing which is then followed by a second stage of steam desalting with no aggressive high shear mixing.
Figure 10:
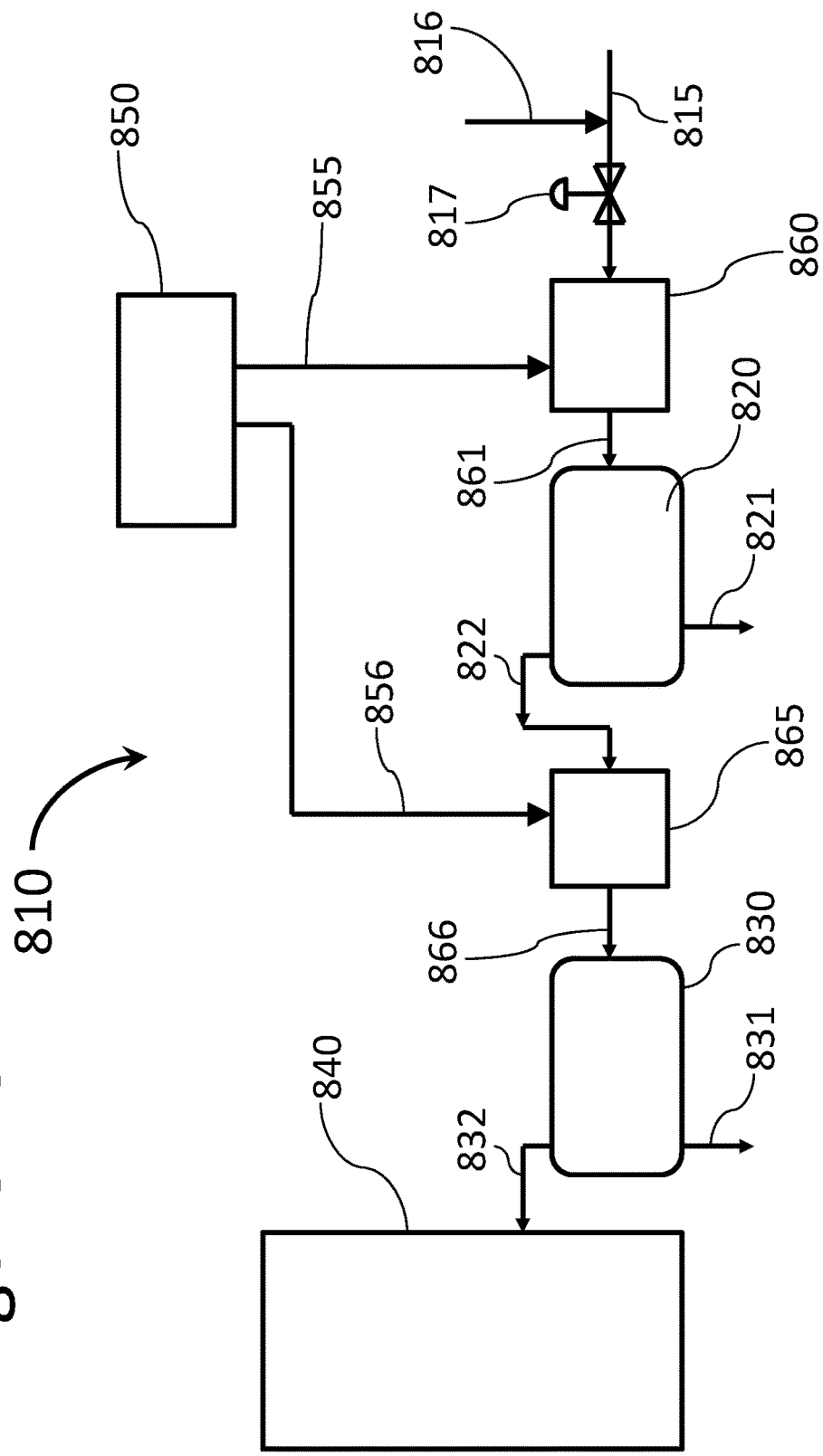
FIG. 10 is a schematic view of an eighth embodiment of the steam desalting invention where the crude oil is subjected to two desalting stages and the crude oil receives water and aggressive high shear mixing first followed by steam injection where the steam is allowed to condense and the steam bubbles to fully collapse before the gravity separator followed by a second stage of steam desalting with no aggressive high shear mixing.

The embodiment shown in FIG. 10 is a variation from the embodiment shown in FIG. 9 where the crude oil is subjected to wash water injection first at water injection feedline 816 and aggressive high shear mixing at high shear mixer 817 followed by steam injection. In this arrangement, the high shear mixer may be set to a very aggressive setting shearing the wash water droplets and creating exceptionally high turbulence intending to get the benefit of many, many violent collisions knowing that two successive steam injection steps will occur downstream. This means that even if the wash water droplets are exceptionally small, the likelihood that the vast majority of wash water droplets will be coalesced with one or more steam bubbles and grow back to a size that is amenable to gravity separation. There is an appeal to this arrangement in that the shells on the brine droplets are being attacked both kinetically and by steam in a manner that takes great advantage of the highest possible turbulence practical. Again, the steam is added at steam-crude mixing zone 860 where all the steam bubbles fully condense and collapse before entering the first stage gravity separator 820, a second stage of steam is added at second stage steam-crude mixing zone 865 and further gravity separation is accomplished in second stage gravity separator 830. The steam is supplied by steam production system 850 which is delivered by steam injection lines 855 and 856.

Figure 11:
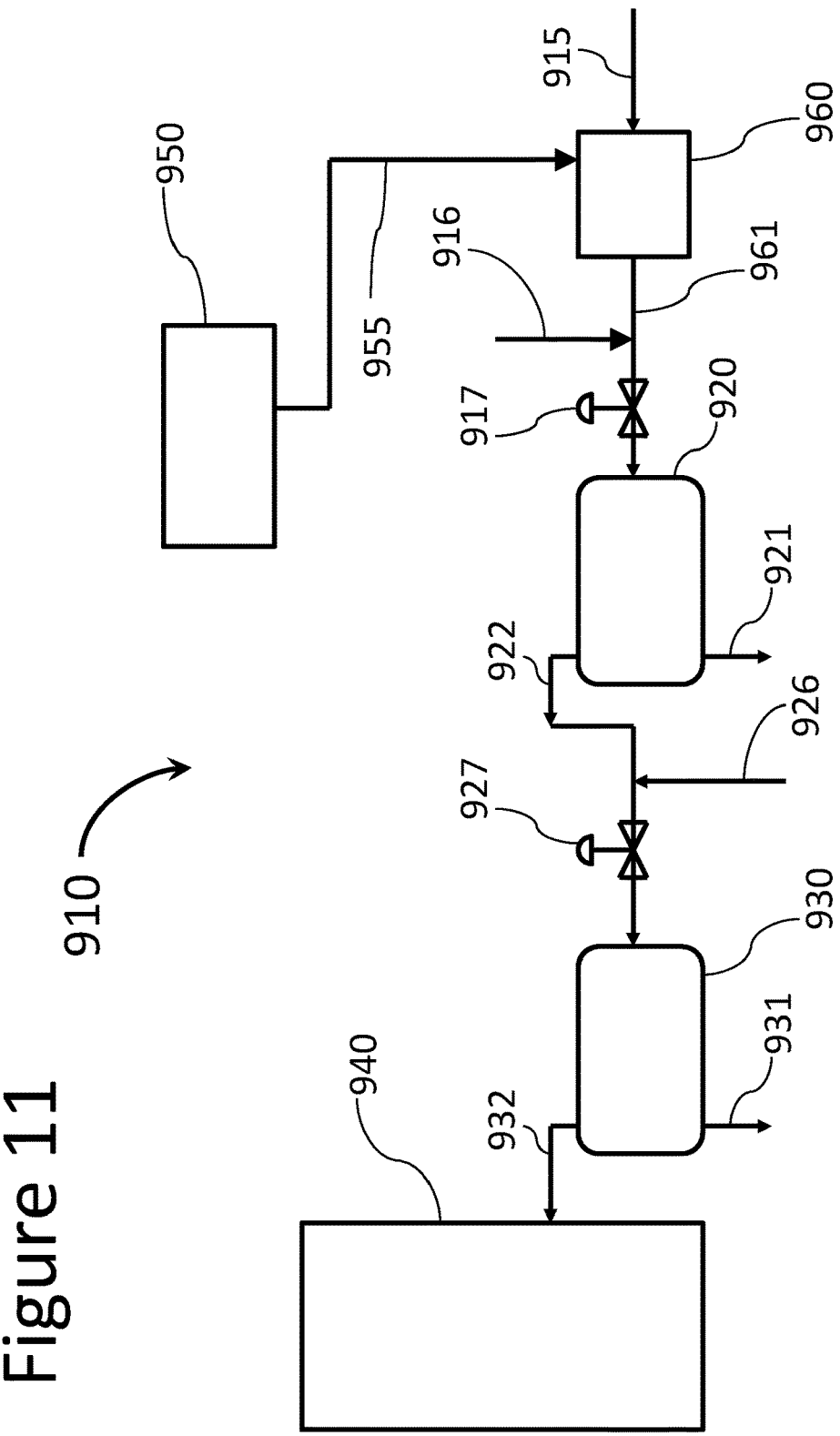
FIG. 11 is a schematic view of a ninth embodiment of the steam desalting invention where the crude oil is subjected to two desalting stages and receives water and aggressive high shear mixing in the first stage, but is first subjected to steam where the steam is allowed to condense and the steam bubbles to fully collapse before the aggressive high shear mixing and gravity separation followed by a second stage comprising water injection and aggressive high shear mixing with gravity separation.
Figure 12:
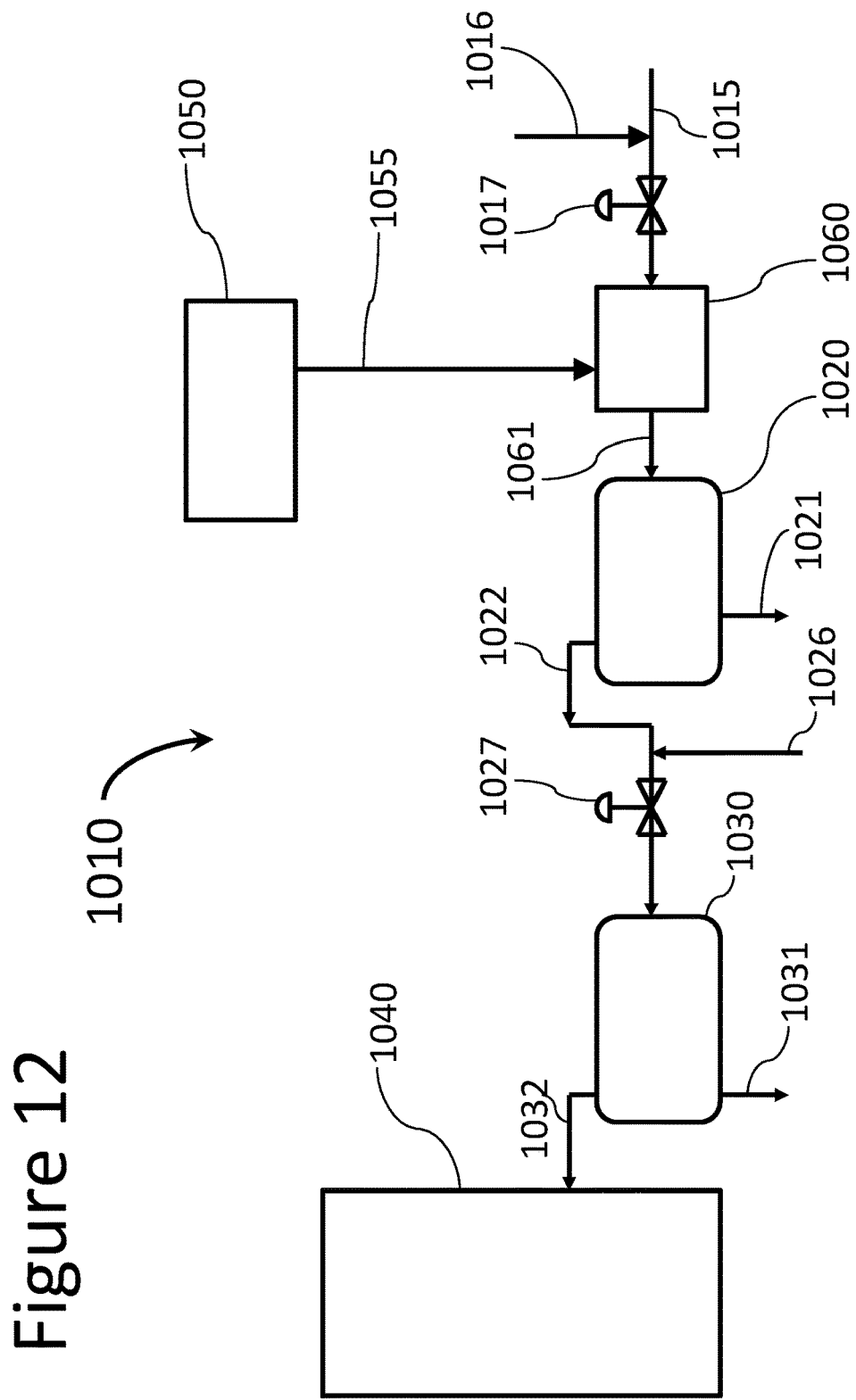
FIG. 12 is a schematic view of a tenth embodiment of the steam desalting invention where the crude oil is subjected to two desalting stages and receives water and aggressive high shear mixing first in the first stage and is then subjected to steam injection where the steam is allowed to condense and the steam bubbles to fully collapse before gravity separation which is then followed by a second stage comprising water injection and aggressive high shear mixing with gravity separation.

It may be that a refinery may be determined to best take advantage of steam injection for salt removal by getting the heat into the crude oil early in the process and then using water as a supplemental means of salt removal once the highest desired crude oil temperature has been attained. That situation is shown in the next embodiment of the invention in FIG. 11 where the desalting system 910 delivers steam into the crude oil from steam production system 950 via steam injection line 955 to the steam-crude mixing zone 960. The first stage includes liquid water injection via feedline 916 along with aggressive high shear mixing at high shear mixer 917 before the first stage gravity separator 920. A second stage is shown with water injection feedline 926 and high shear mixer 927 and a second stage gravity separator 930.

In a hybrid of the prior described embodiments, a two stage salt removal system 1010 of the present invention is shown where the steam is injected downstream of both the first liquid water feedline 1016 and the high shear mixing valve 1017. The steam is added early to the system to get the crude oil heated prior to the first stage separator 1020, but, as described above, the first stage high shear mixer may be set to a more highly aggressive setting with the steam injection just downstream. This embodiment works very similar to the other described systems where the gravity separator 1020 yields a first pass desalted crude via line 1022 for the second stage desalting and in the second stage, water is added via water feedline 1026 and aggressive mixed at high shear mixer 1027.

Figure 13:
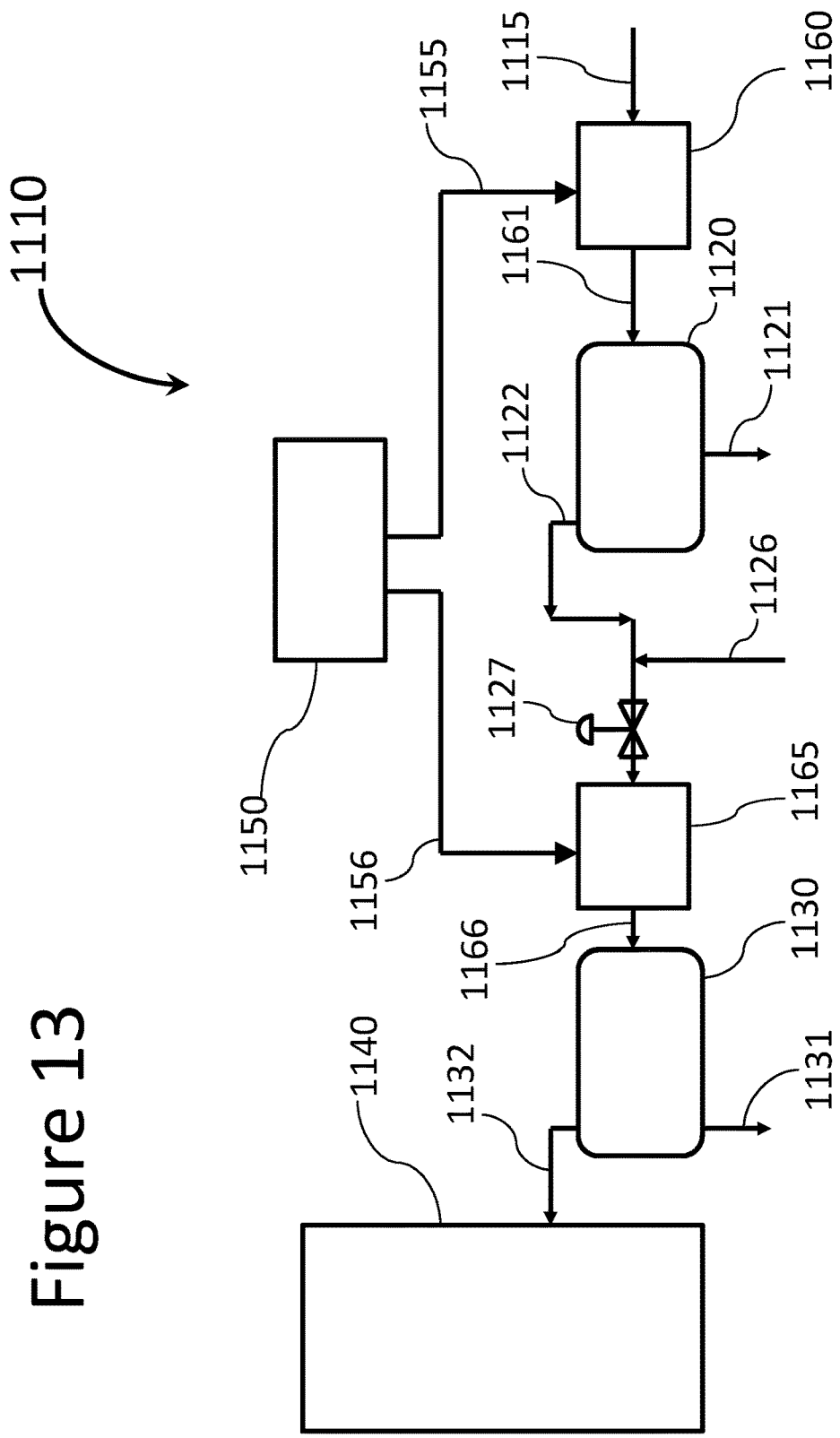
FIG. 13 is a schematic view of an eleventh embodiment of the steam desalting invention where the crude oil is subjected to two desalting stages and receives steam injection where the steam bubbles are allowed to condense and fully collapse before gravity separation and in the second stage has water injected with aggressive high shear mixing before steam is injected and allowed to condense and the steam bubbles allowed to fully collapse before gravity separation.

FIG. 13 shows another variation of the invention where the salt is removed in a two stage desalting system 1110, but where steam is added at the beginning of the desalting process and again at the end. The first addition of steam may operate to raise the crude oil temperature to the highest desirable temperature to allow the steam to capture as much salt at steam is able and then let the salty water escape from the crude in the first stage gravity separator 1120. However, to the extent that high shear mixing is able to remove more of the brine, water is added in the second stage at feedline 1126 and aggressively mixed at high shear mixer 1127. Additional steam is provided after the high shear mixer 1127 at the second stage steam-crude mixing zone 1165 and, as previously discussed, the setting for the high shear mixer may be set a little extra aggressively with the second stage steam injection downstream to use steam bubbles to coalesce all of the water droplets suspended in the crude oil.

Figure 14:
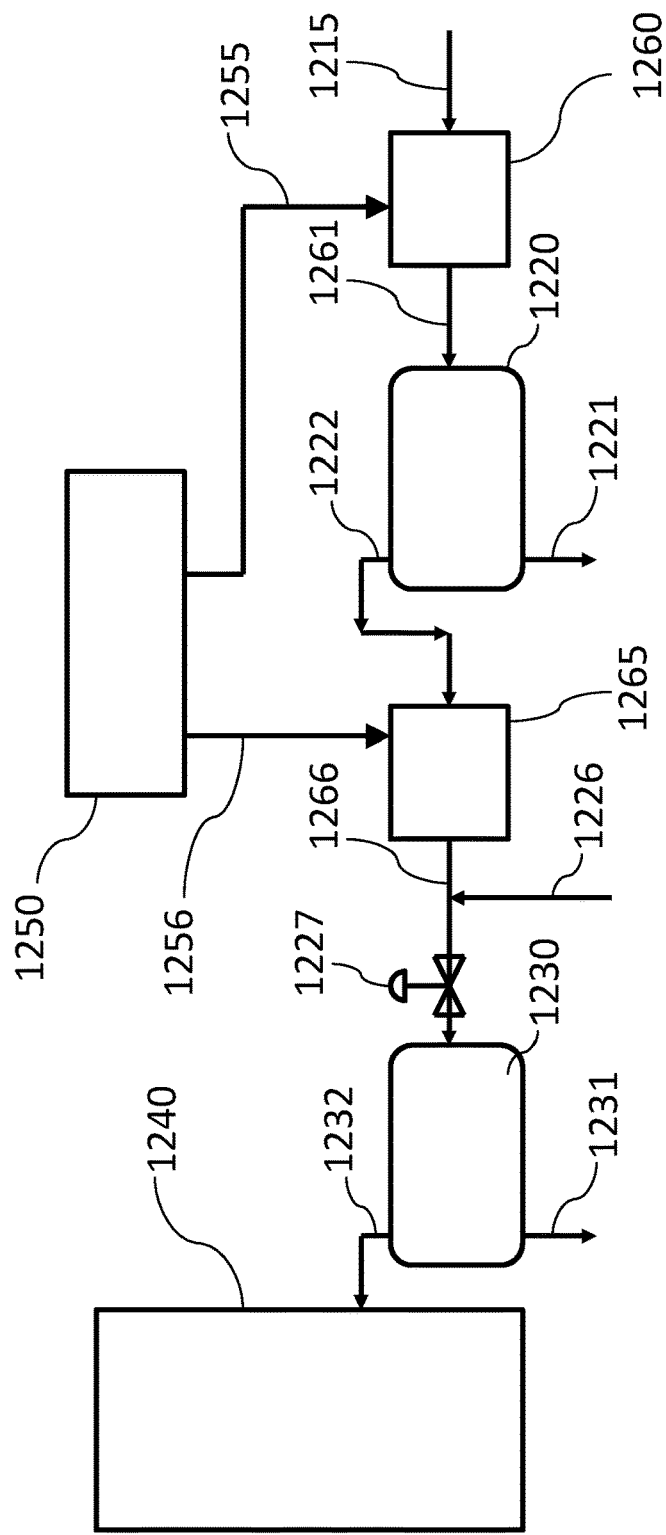
FIG. 14 is a schematic view of a twelfth embodiment of the steam desalting invention where the crude oil is subjected to two desalting stages and receives steam injection where the steam bubbles are allowed to condense and fully collapse before gravity separation and in the second stage has water injected with aggressive high shear mixing after steam has been injected and allowed to condense and the steam bubbles allowed to fully collapse before the aggressive high shear mixing.

The embodiment shown in FIG. 14 is a slight variation to the embodiment shown in FIG. 13, but this is still an arrangement that may find use in an existing refinery where faith in the conventional technology of wash water and high shear mixing is much higher than steam addition. In this arrangement, steam is added in a first stage alone without wash water and high shear mixing. The steam is added at steam-crude mixing zone 1260 such that all of the steam bubbles are allowed to condense and collapse before the first stage gravity separator 1220. Steam is again added in the second stage at steam-crude mixing zone 1265 and the crude is finally subjected to the old reliable wash water and high shear mixing as shown with water feedline 1226 and high shear mixer 1227.

Figure 15:
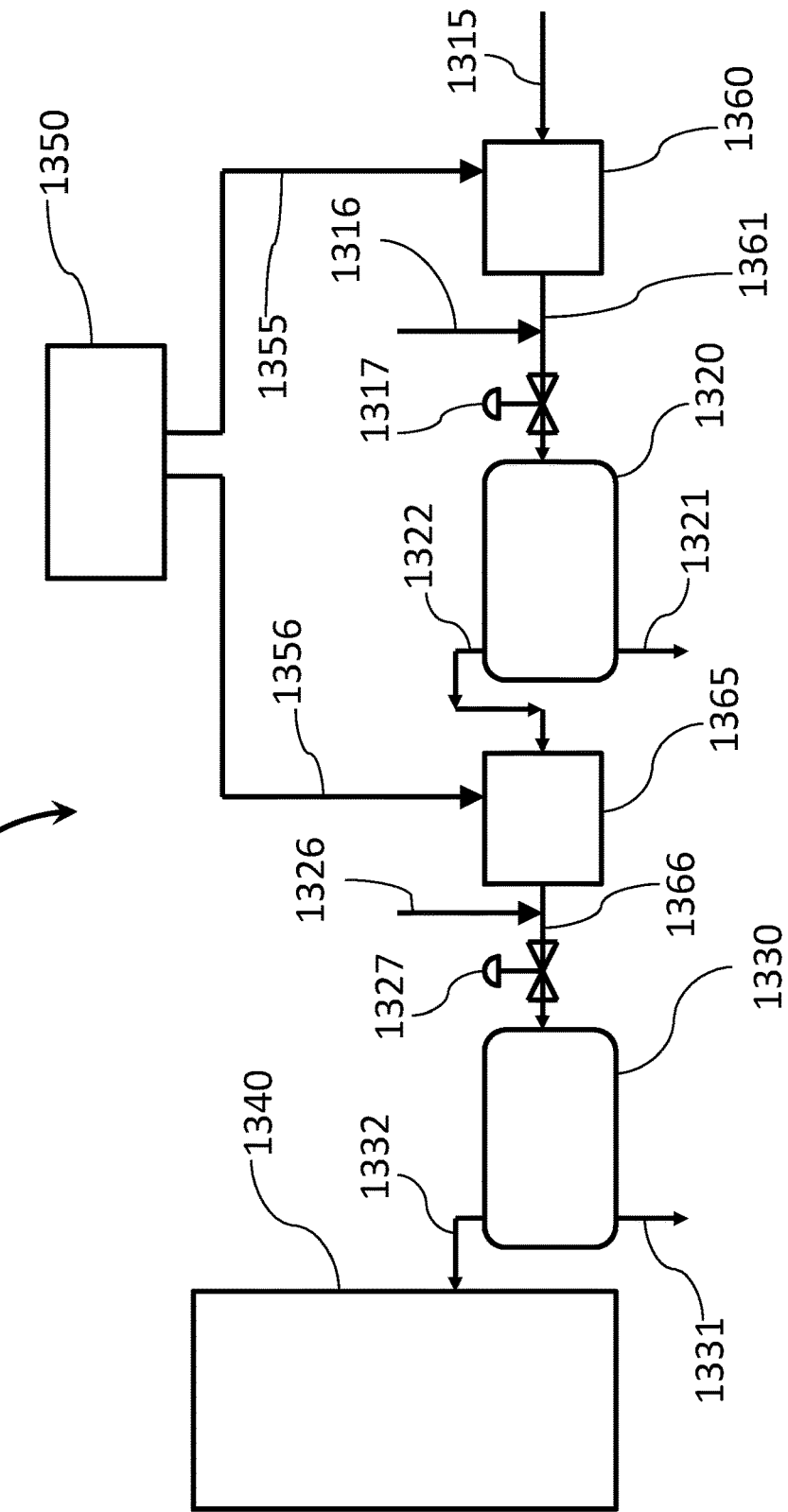
FIG. 15 is a schematic view of a thirteenth embodiment of the steam desalting invention where the crude oil is subjected to two desalting stages and receives water and aggressive high shear mixing in the first stage, but is first subjected to steam where the steam is allowed to condense and the steam bubbles to fully collapse before the aggressive high shear mixing and gravity separation and similarly in the second stage has water injected with aggressive high shear mixing after steam has been injected and allowed to condense and the steam bubbles allowed to fully collapse before the aggressive high shear mixing and gravity separation.

In still yet another embodiment of the present invention, a steam desalter system 1310 is shown in FIG. 15 where two successive stages are arranged in essential duplication where each stage gets steam injection first where the steam bubbles are allowed to condense and collapse before water and high shear mixing are accomplished. This arrangement will be desirable when a steam only system would overheat the crude, but it is desired to contact salt crystals and brine microdroplets in each stage.

Figure 16:
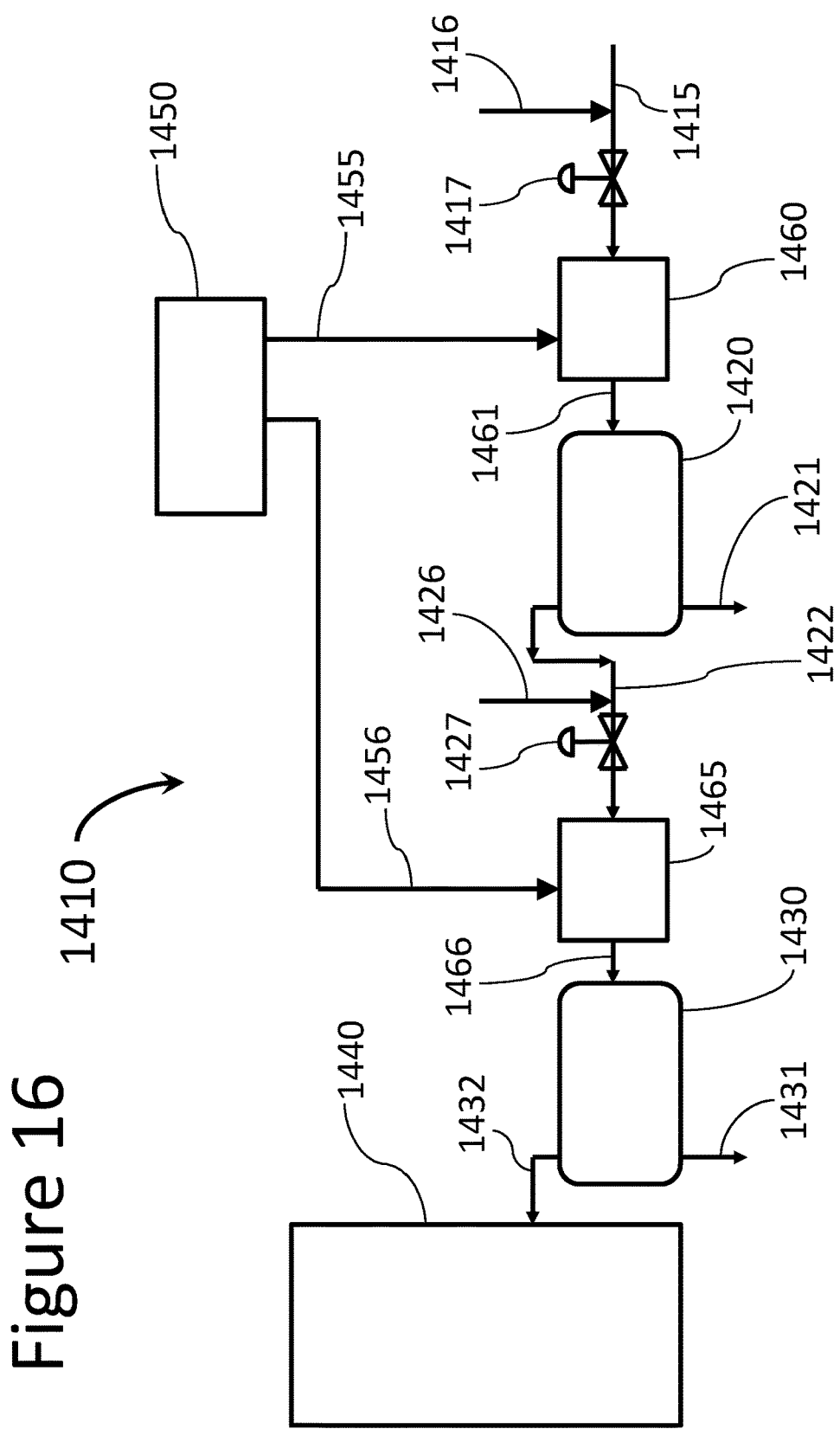
FIG. 16 is a schematic view of a fourteenth embodiment of the steam desalting invention where the crude oil is subjected to two desalting stages and first receives water and aggressive high shear mixing in the first stage followed by steam injection after the aggressive high shear mixing where the steam is allowed to condense and the steam bubbles to fully collapse before the gravity separation and similarly in the second stage has water injected with aggressive high shear mixing before steam is injection is injected and allowed to condense and the steam bubbles allowed to fully collapse before the gravity separation.

In a variation of the embodiment shown in FIG. 15, another embodiment is shown in FIG. 16 where the steam desalter system 1410 includes two stages that are again duplicates of one another, but where the water injection and high shear mixing occurs before the steam injection. So, in this embodiment, water is injected from feedline 1416 and the crude and water mixture are subjected to aggressive high shear mixing at the high shear mixer 1417. This is followed by the steam injection at steam-crude mixing zone 1460. With the steam addition following the high shear mixing, the aggressiveness of the high shear mixing may be altered to be more aggressive. Again, gravity separator 1420 provides first pass desalted crude oil via line 1422 while salty water is removed via drain 1421.

Turning now to getting the steam to disperse into the crude oil and to efficiently remove contaminants turns out to be a rather un-simple task. Basically, steam does not easily mix with the crude. Steam is far less dense than the crude and quickly moves through the crude oil. If poorly dispersed steam gets to the wall of the steam-crude mixing zone, it may form a stagnant steam cavity within the system which would reduce the efficiency of salt extraction by reducing the interaction of the steam bubbles with the suspended salt. A second risk for poorly dispersing steam in the crude oil is if a steam bubble were to pass into the gravity separator which is intended to operate in a quiescent regime. Steam bubbles are very disturbing to quiescent regimes.

Figure 17:
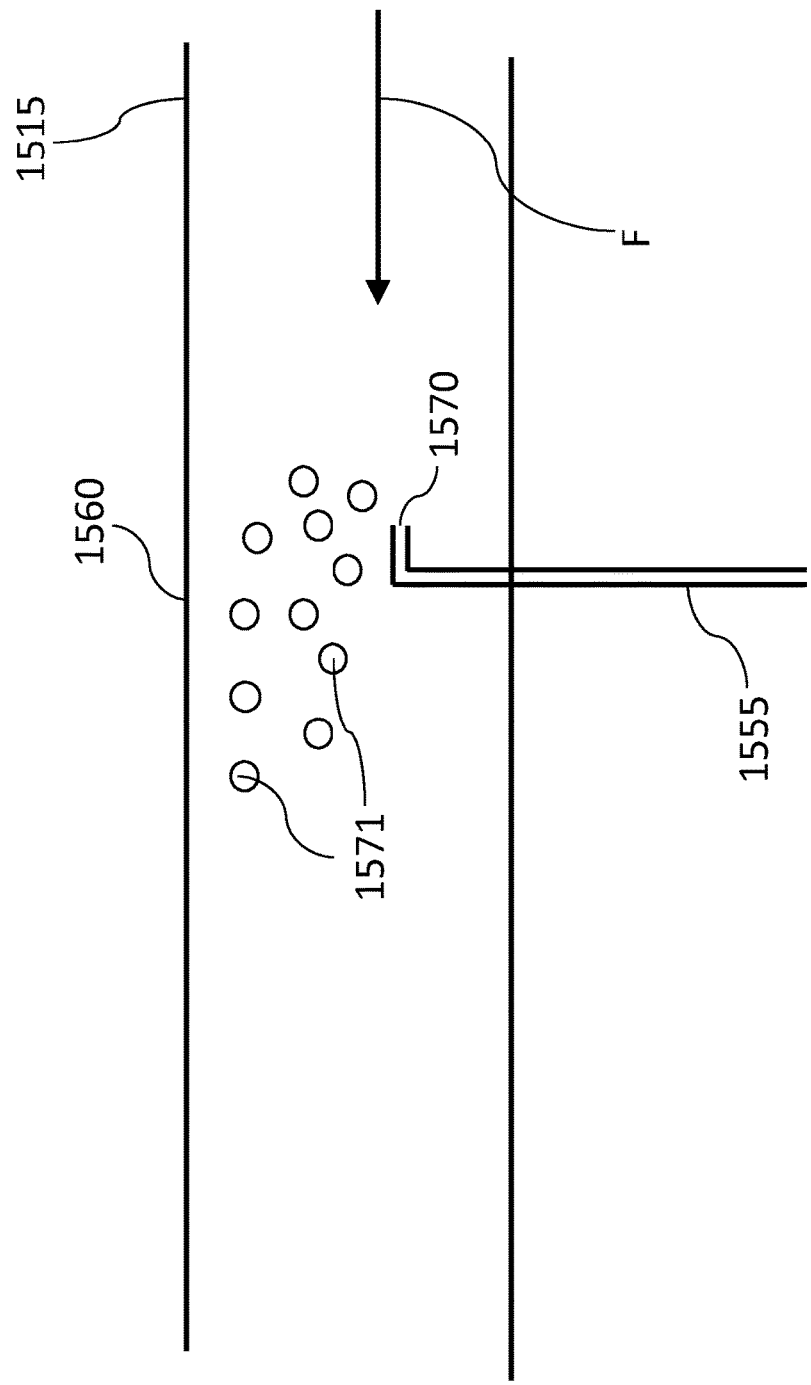
FIG. 17 shows a lance type steam injector directing steam against the direction of flow of crude oil entering the steam-crude mixing zone.

So, recognizing that as steam blends with the crude oil, it forms bubbles that tend to expand quickly (moving from a high pressure delivery system to a lower pressure crude oil pipe), orienting the steam delivery device into the crude oil to make sure the steam bubbles condense within the crude and away from pipe walls and vessel walls would tend to optimize the advantages described above. In FIG. 17, crude oil enters a the steam-crude mixing zone 1560 via conduit 1515 flowing in a direction indicated with the letter "F" where the steam-crude mixing zone 1560 is simply a section of the pipe constituting both. In other embodiments described below, the steam-crude mixing zone is a distinct vessel. Steam is injected via feedline 1555 via steam port 1570 that is inside the steam-crude mixing zone 1560 oriented in opposition to the flow of the crude oil F. The steam bubbles 1571 are dispersed within steam-crude mixing zone 1560 with time and space to give up their heat and condense and collapse to liquid water before contacting the side or outer walls of the pipe. Studies of the steam bubbles in crude oil suggest that they collapse within a second of emerging from the port 1570 of the steam injector 1555 and typically within about a tenth of a second. At the same time, the crude oil is typically not in laminar flow but rather has vortices and eddies and turbulence. Steam is delivered at a pressure of between 25 psi and 450 psi depending on the source of the steam and perhaps other uses in heat exchangers and the like prior to being injected into the steam-crude mixing zone 1560. The pressure and velocity of the steam passing through the feedline 1555 is sufficiently higher than pressure and velocity of the crude oil in conduit 1515 to keep crude from entering the steam port 1570. The steam bubbles expand, cool and then collapse to liquid water droplets before exiting the steam-crude mixing zone 1560.

Figure 18:
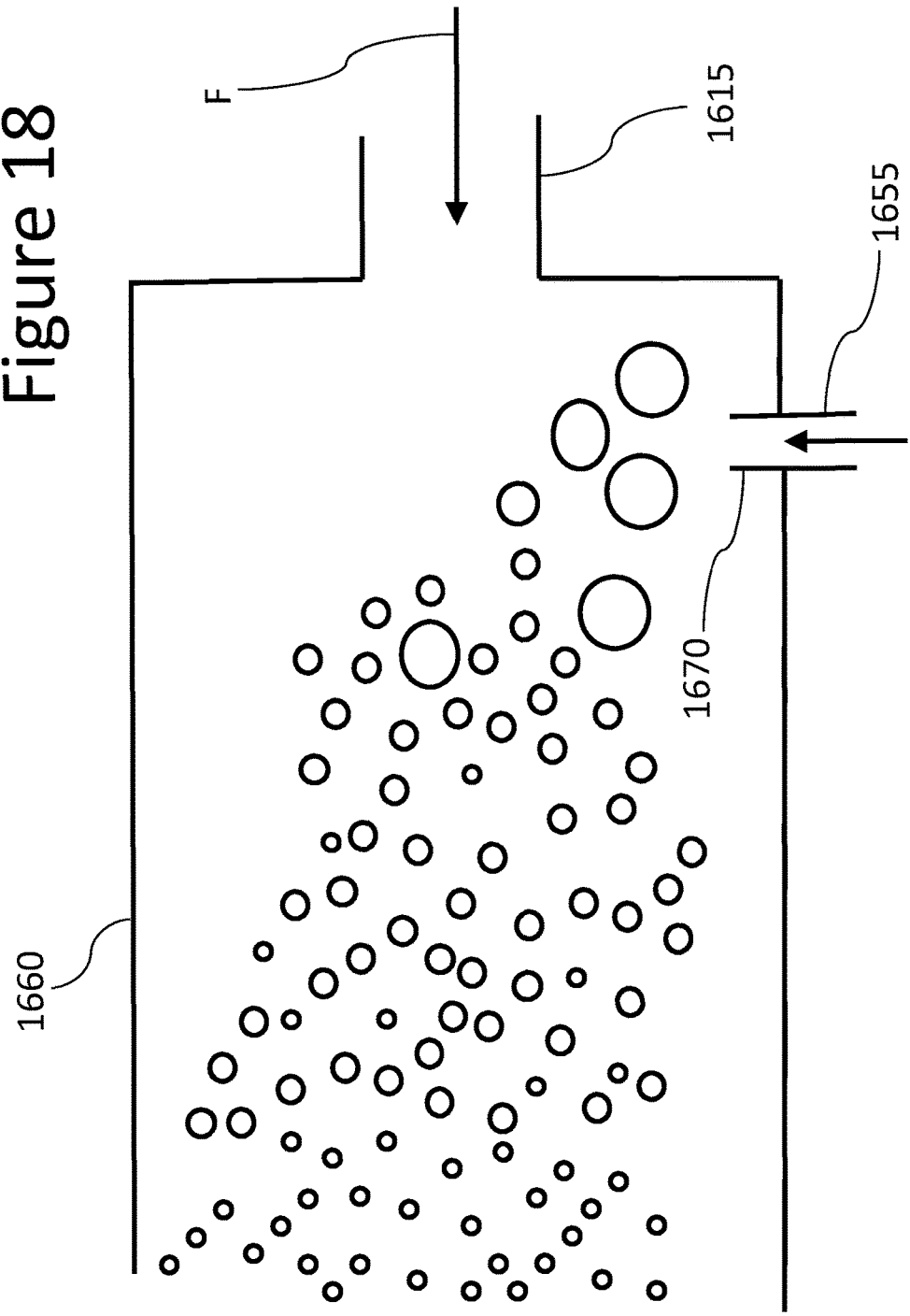
FIG. 18 shows a lance type steam injector directing steam into the flow of steam in the steam-crude mixing zone where the steam is directed into a generally horizontal flow of crude oil.

Turning now to FIG. 18, another embodiment of the steam port is shown at 1670 where steam is injected into the lower portion of the steam-crude mixing zone 1660. The port extends into the mixing zone to a distance to reduce the likelihood of a steam bubble proceeding directly to the wall of the steam-crude mixing zone 1660 before it would fully condense. The steam port 1670 is also positioned low in the steam-crude mixing zone and away from the exit end (toward the left of drawing figure) to provide space for the steam bubbles to fully condense before exiting the steam-crude mixing zone or from contacting an outside wall of the steam-crude mixing zone. As the steam is less dense than the crude oil, the bubbles are expected to progress with the flow of the crude and progress upward.

Figure 19:
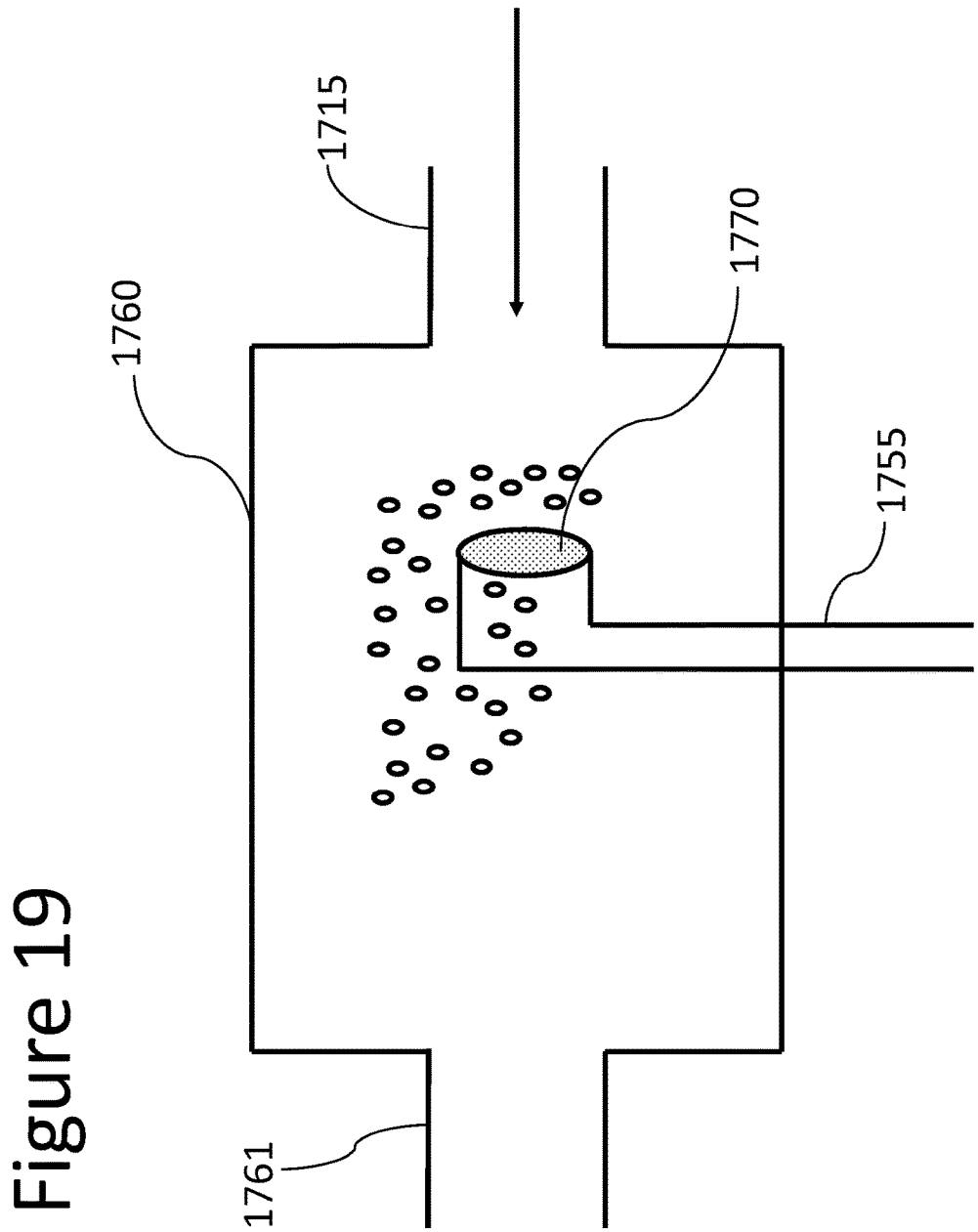
FIG. 19 is a schematic view of a shower head steam injector comprising a plurality of small apertures for injecting steam against the direction of flow of the crude oil into the steam-crude mixing zone.

In FIG. 19, another alternative embodiment of the steam injection port is shown at 1770. In this arrangement, the port is physically larger than the port in FIG. 17, but includes a shower-head like nozzle with a plurality of orifices to emit steam while preventing crude oil from backing up into the steam injector. This is expected to produce a larger number of small bubbles to reduce the time and space needed for the steam bubbles to fully condense and collapse.

Figure 20:
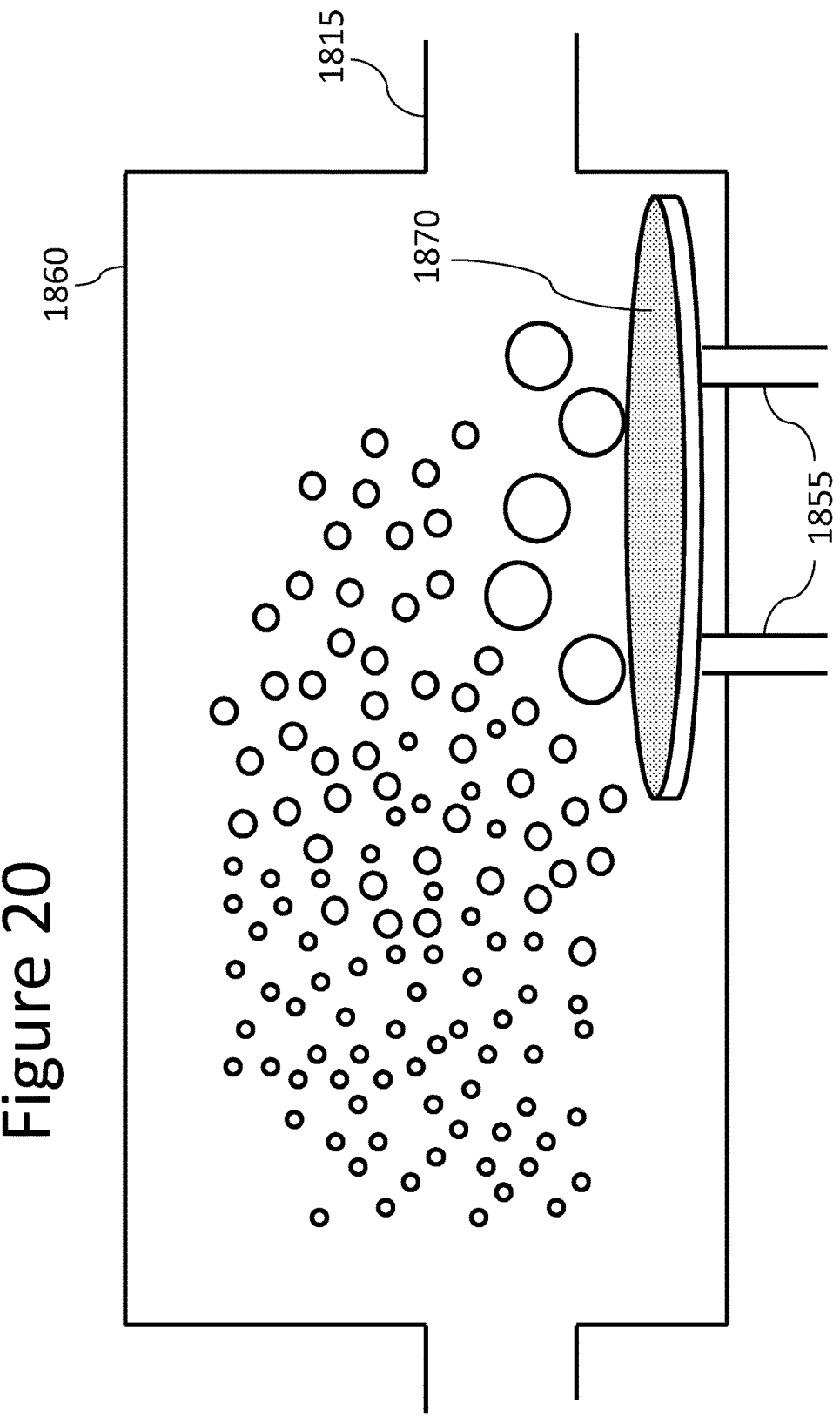
FIG. 20 is a schematic perspective view of an ironing table tip steam injector in a low portion of the steam-crude mixing zone with crude oil flowing generally horizontally while steam is injected at the lower portion through a generally flattened steam head with a great plurality of steam apertures to deliver steam bubbles into the crude oil.

Turning now to FIG. 20, a further alternative embodiment of the steam injection port is shown at 1870. This embodiment is similar to the two previous embodiments in that it includes a great many small orifices to produce smaller steam bubbles, but also positions the port low in the steam-crude mixing zone 1860 and closer to the inlet end and away from the exit end. This embodiment has an appearance suggestive of an ironing board. Again, the steam bubbles are intended to mix with and collapse fully within and surrounded by the crude oil and not against a side wall of the pipe or mixing zone 1860.

Figure 21:
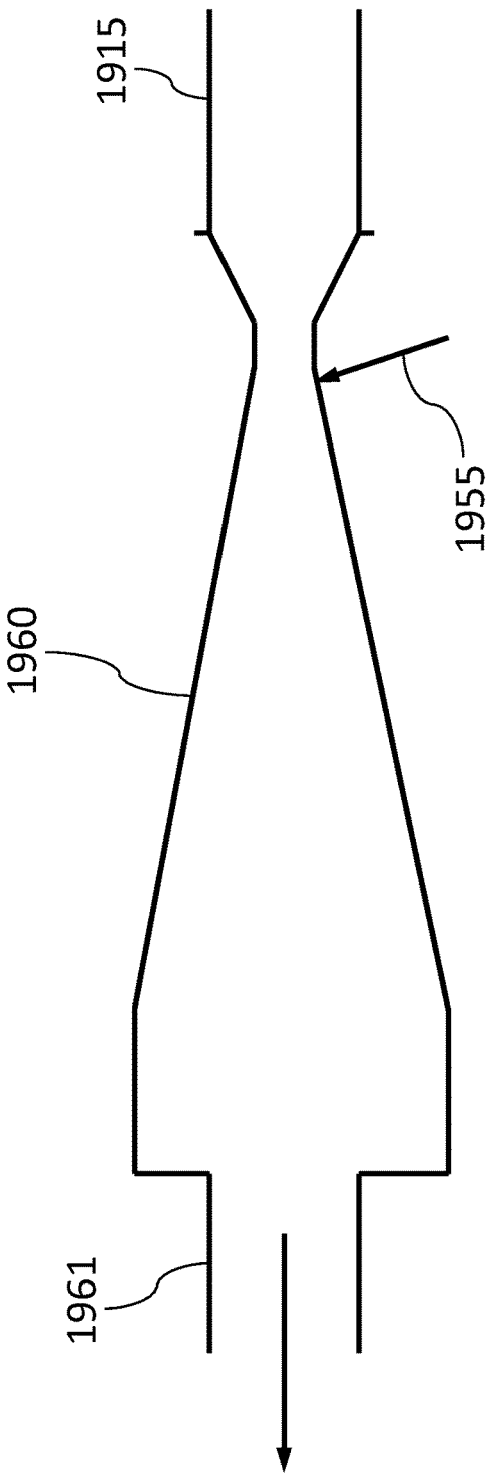
FIG. 21 is schematic view of a venturi type steam injector for injecting steam into crude oil as it enters the steam-crude mixing zone.

Turning to FIG. 21, an arrangement for admitting steam into crude oil is shown comprising a venturi type structure where a narrowed neck is positioned between an expanding conical shaped steam-crude mixing zone 1960 and the crude oil conduit 1915. In this arrangement, yet another embodiment for injecting steam into crude oil, the crude oil is caused to speed up due to the reduced cross section while steam is injected from steam supply line 1955. The brief period of increased velocity increases the turbulence of the crude oil which also increases the mixing of steam bubbles with crude oil to enhance the opportunity for the steam bubbles and resulting water droplets to contact and capture salt into larger water droplets more amenable to gravity separation. The violence of the increased turbulence in this system is far, far less than the turbulence created at a high shear mixer of current desalting technology, but does create conditions that increase the contacts between steam bubbles and suspended salt in the crude.

Figure 22:
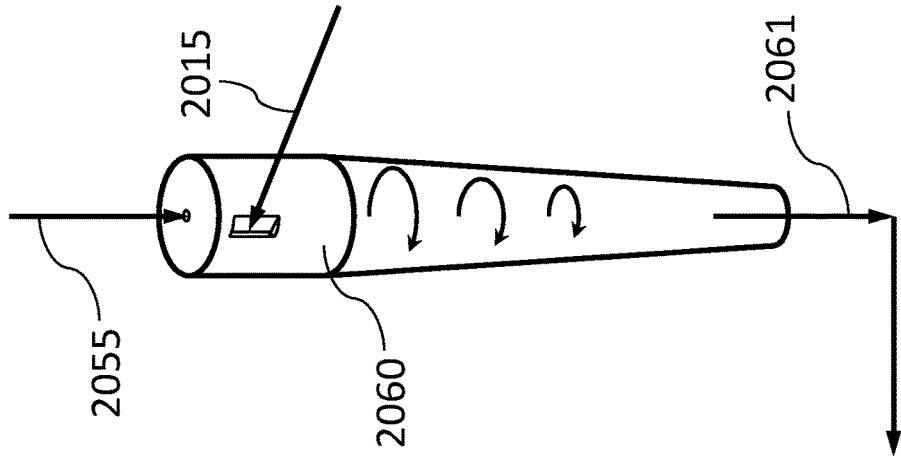
FIG. 22 is a schematic perspective view of a hydrocyclone steam injector for injecting steam into crude oil where the oil flow is rotating within the steam-crude mixing zone.

FIG. 22 also shows an interesting arrangement for injecting steam into a flow a crude oil. The crude oil enters a vortex steam-crude mixing zone 2060 via crude oil conduit 2015 while the steam injector 2055 injects steam at the top of the vortex steam-crude mixing zone 2060. The crude oil and steam bubbles flow in a vortex that spins down to the bottom. Along the way, the lower density steam bubbles collapse to water droplets that are higher density than the continuous phase crude oil. As such, the bubbles stay closer to the center and away from the outside wall until fully collapsed and then congregate along the outside wall where coalescing of the droplets may occur. The steam-crude mixing zone 2060 includes a non-moving, generally cylindrical space where high speed flow creates centrifugal forces. The kinetic forces developed by relatively fast moving crude oil increase contacts between salt and water whether the water is vapor or liquid and, as the contour of the steam-crude mixing zone 2060 includes a progressively smaller diameter at the bottom, the forces driving coalescing increases as the mixture of crude oil and water reach their highest velocities creating early stage density-based separation at the bottom.

Figure 23:
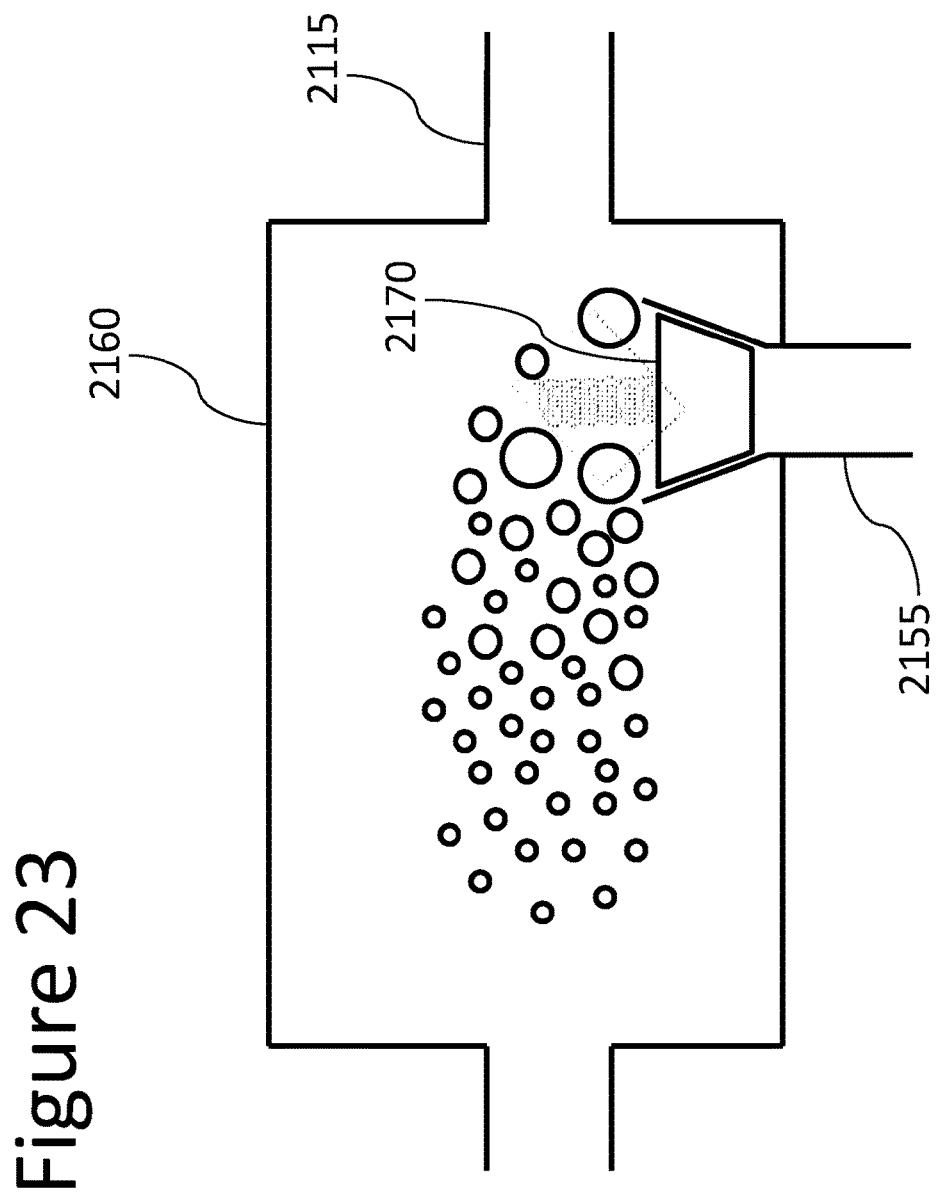
FIG. 23 is a schematic elevation view of another alternative injector for injecting steam into crude oil comprising a spring biased stopper and bell shaped tube working together to squeeze steam into the steam-crude mixing zone.

In yet another embodiment for injecting steam into crude oil to remove salt and other contaminants, FIG. 23 shows a steam injection port 2170 comprising a spring biased plug that is pushed by a spring into the open bell end of a truncated cone steam pipe such that steam exits around the periphery of the plug. This arrangement provides a means for adjusting the size of the opening into the crude oil that should provide a level of control of the size of steam bubbles entering the crude oil. Ideally, the steam pressure could be independently adjusted so that the spring force and steam pressure could alter the rate at which steam enters the crude oil while maintaining relatively constant size bubbles or conversely maintain a constant flow of steam while altering the size of the bubbles. It would seem that larger bubbles would yield larger water droplet size which is better for gravity separation. However, there may be situations or circumstances where smaller bubbles or smaller droplets are desirable and the ability to modulate those sizes would be helpful.

Figure 24:
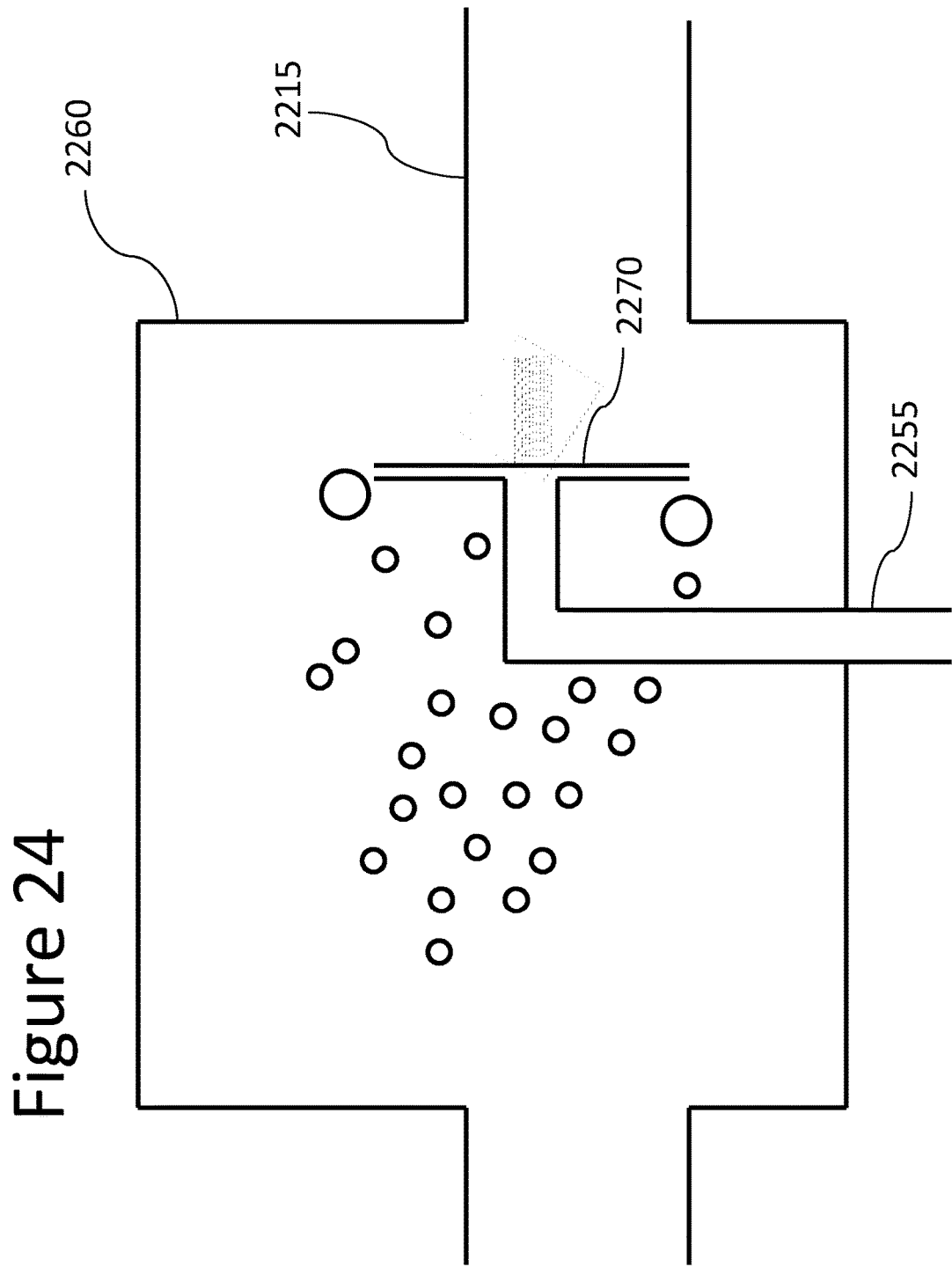
FIG. 24 is a schematic elevation view of an additional alternative injector for injecting steam into crude oil comprising a pair of cymbal type plates spring biased together for squeezing steam into a steam-crude mixing zone.

A different, but similar arrangement is shown in FIG. 24 where steam is released at the interface of two cymbal-shaped plates 2270, but where one of the plates is fixed and sealed to the end of the steam delivery system 2255 in fluid communication with the steam production system (not shown) and where steam is released at the common peripheral edges of the flush plates. The other plate is spring biased against the first to create a tight but not impervious interface. The spring force is preferably adjustable to alter the steam flow rate and bubble size entering the steam-crude mixing zone. A control valve (not shown) in the steam delivery line 2255 may be used in conjunction with the control of the spring force biasing the second plate to the first to control the rate at which steam is added to the steam and the size of the steam bubbles. The steam bubbles in this arrangement would be spaced well apart to heat crude oil across a larger diameter of the steam-crude mixing zone 2260.

Figure 25:
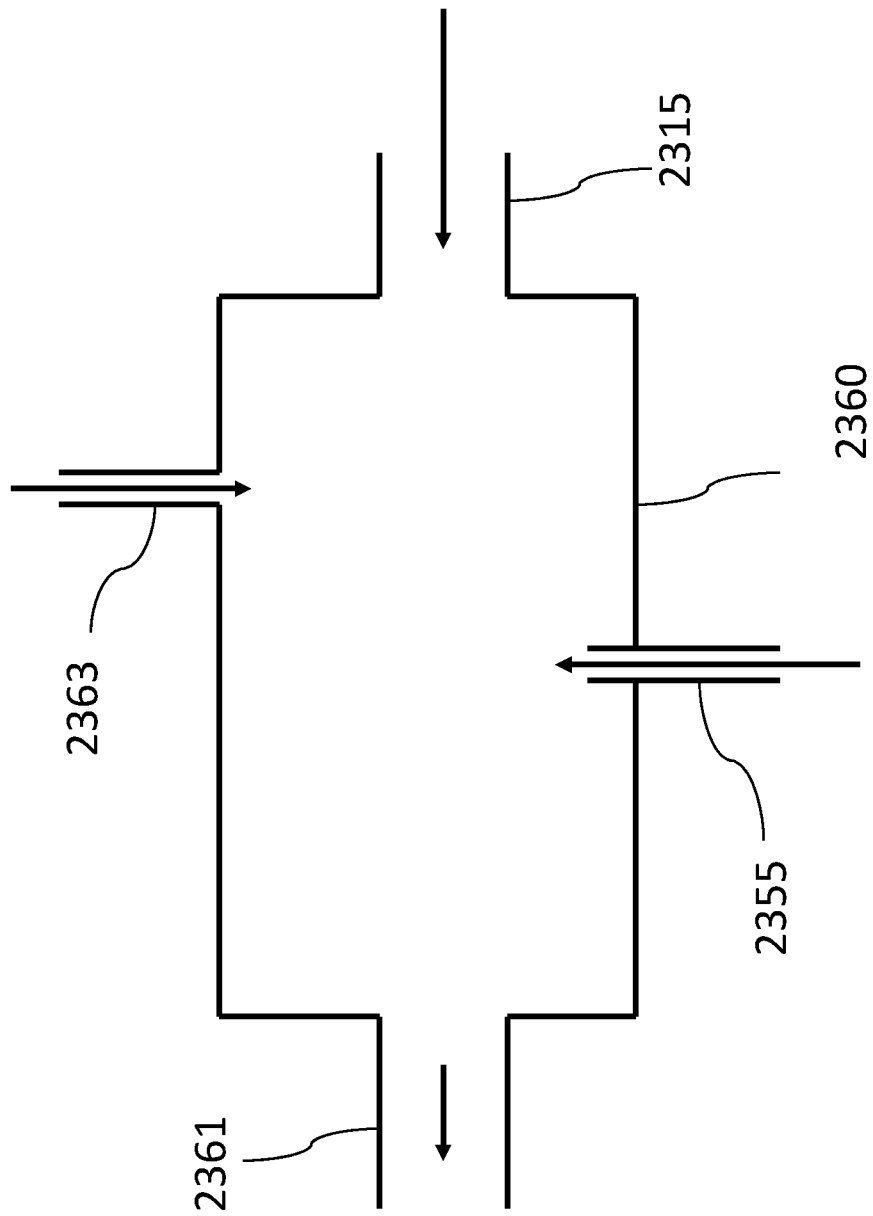
FIG. 25 is a schematic view of another embodiment of the present invention where steam along with at least one process chemical are added to the oil to remove salt and other contaminants and where the process chemicals enable the condensed steam to better coalesce and be more completely removed from the crude along with the dissolved salts.

In FIG. 25, a different perspective of the present invention is shown where not only is steam added to the crude oil, but process chemicals may be added to the crude oil to aid with the capture of the salt or subsequent removal of the water. A demulsifier would be a logical chemical to add to the crude oil to aid in getting the small water droplets to separate from the crude oil. So, while steam is added to the steam-crude mixing zone 2360 via steam injection system 2355, emulsifier is added through chemical injector port 2363. Using demulsifiers in conjunction with steam addition will aid in separating the resulting water droplets from the crude oil in the settling vessel 1020. Such chemicals are believed to work with any of the steam injection arrangements shown in the prior figures.

Figure 26:
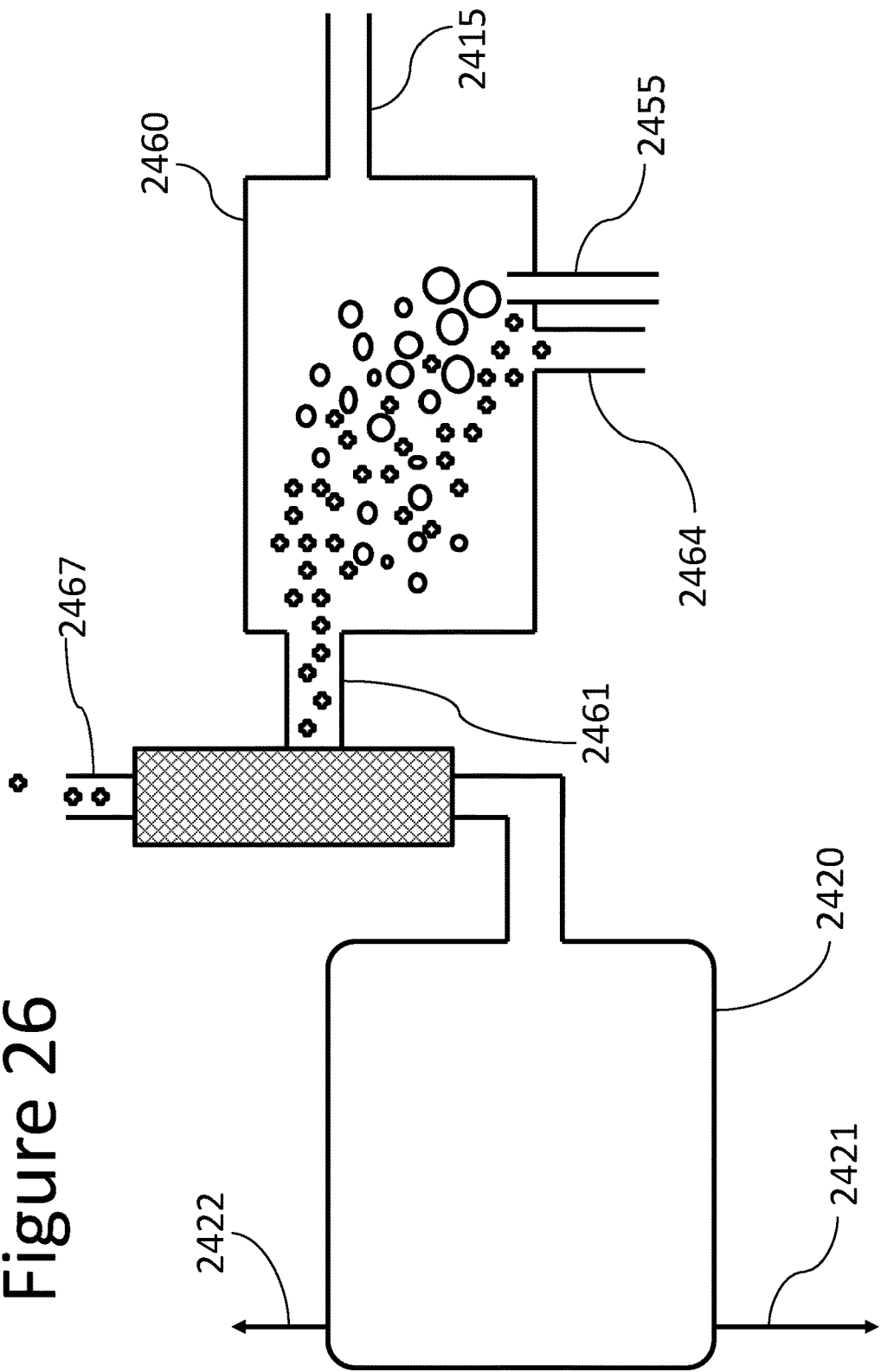
FIG. 26 is a schematic view of a further alternative embodiment of the present invention where steam and light hydrocarbon gas is added to the crude oil and the light gas aids in the coalescing of the condensed steam as water droplets combine into larger water droplets for easier and more complete separation in the gravity separator.

In FIG. 26, to augment the steam injection into crude oil for desalting crude oil, turbulence or stirring of the crude oil is believed to aid in additional salt capture and removal. To accomplish additional stirring, gas is injected into the crude oil to create a churning mixture where the gas is generally easily separable from the crude oil. So, while the steam bubbles are intended to condense and collapse in steam-crude mixing zone 2460, gas bubbles are expected to remain in the crude oil while exiting the steam-crude mixing zone. Gas is shown to be injected at feedline 2464 and removed by gas separator 2467. Gas separators are known devices where gas goes out the top and the crude oil would pass into gravity separator 2460. The gas may be a light hydrocarbon gas such as methane, ethane, propane, natural gas and other light hydrocarbons along with inert gases like nitrogen, carbon dioxide. Preferably gases that are easy to separate and create no undesired side reaction with either contaminants or the crude oil are preferred. The gas provides kinetic energy to the crude oil to increase the likelihood and velocity of collisions of steam bubbles, water droplets and brine microdroplets.

Figure 27:
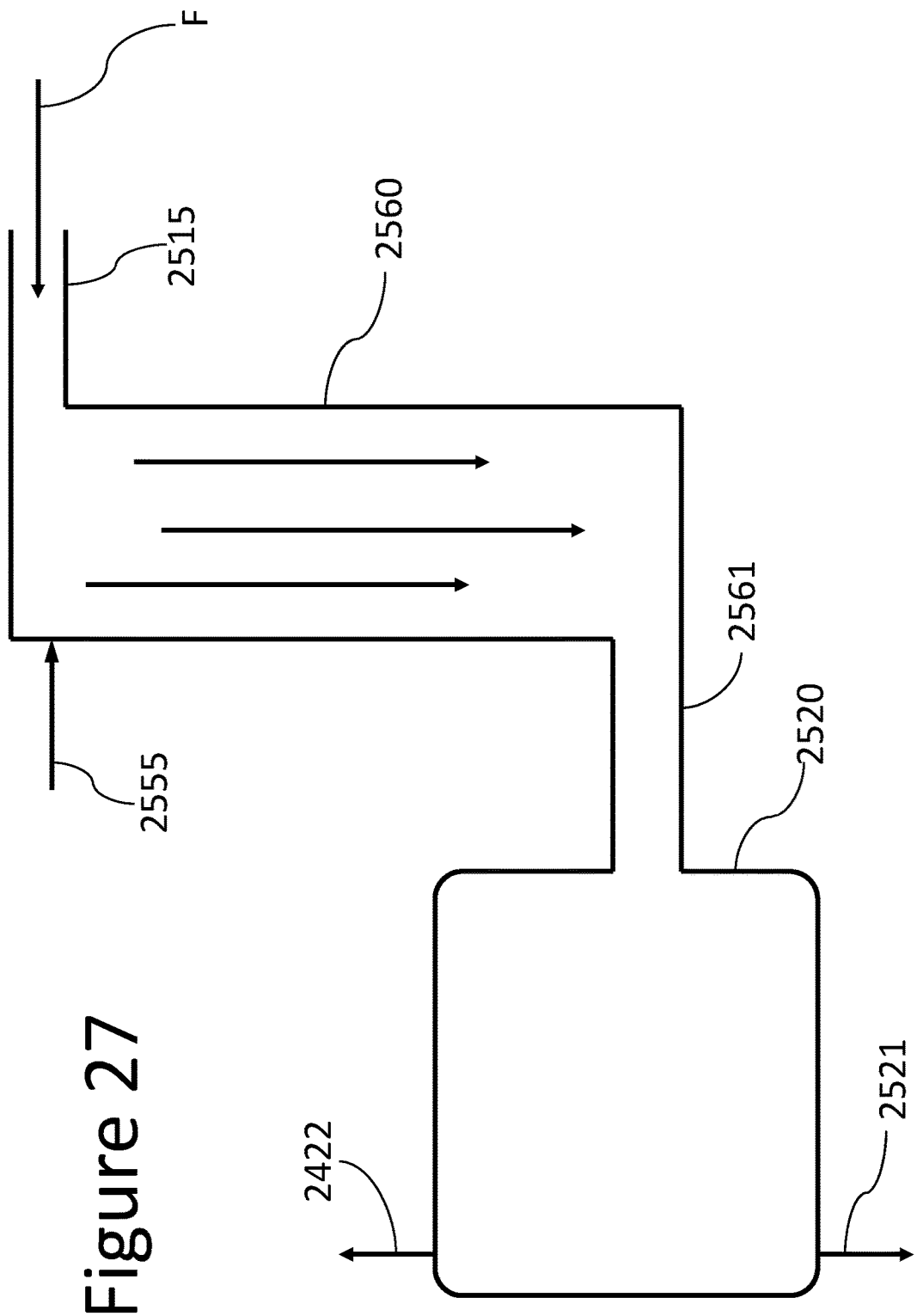
FIG. 27 is a schematic view of an alternative arrangement for the steam-crude mixing zone where the flow of crude oil with the steam flow downwardly insuring that steam bubbles have fully condensed and collapsed before entering the gravity separator.

Turning to another aspect of the present invention, the steam-crude mixing zone has been previously described as a section of the crude oil conduit or pipe such as shown at 2515 in FIG. 27 and as an enlarged section of pipe or a vessel of any shape in which the steam may be injected and the steam bubble would be delivered to contact the crude oil alone and deliver its heat first to the crude oil and not directly to the wall of the pipe or vessel. In FIG. 27, additional attention is given to the steam-crude mixing zone 2560 where it is shown to direct the crude oil in a downward direction. In this arrangement, the vertical dimension is sized to provide more than sufficient time and space for all of the steam bubbles to collapse before entering the settling tank 2520. It should also be understood that this this down draft mixing zone 2560 arrangement is also compatible with other aspects of the present invention whether it includes the various injection devices or the system configurations shown in FIGS. 3-16. Since the steam bubbles are less dense than the crude oil, the steam bubbles tend to resist flow out through line 2561 leading to the gravity separator 2520 until all have condensed and collapsed to liquid water giving refinery operators confidence that no steam bubbles will escape from the mixing zone 2560.

Figure 28:
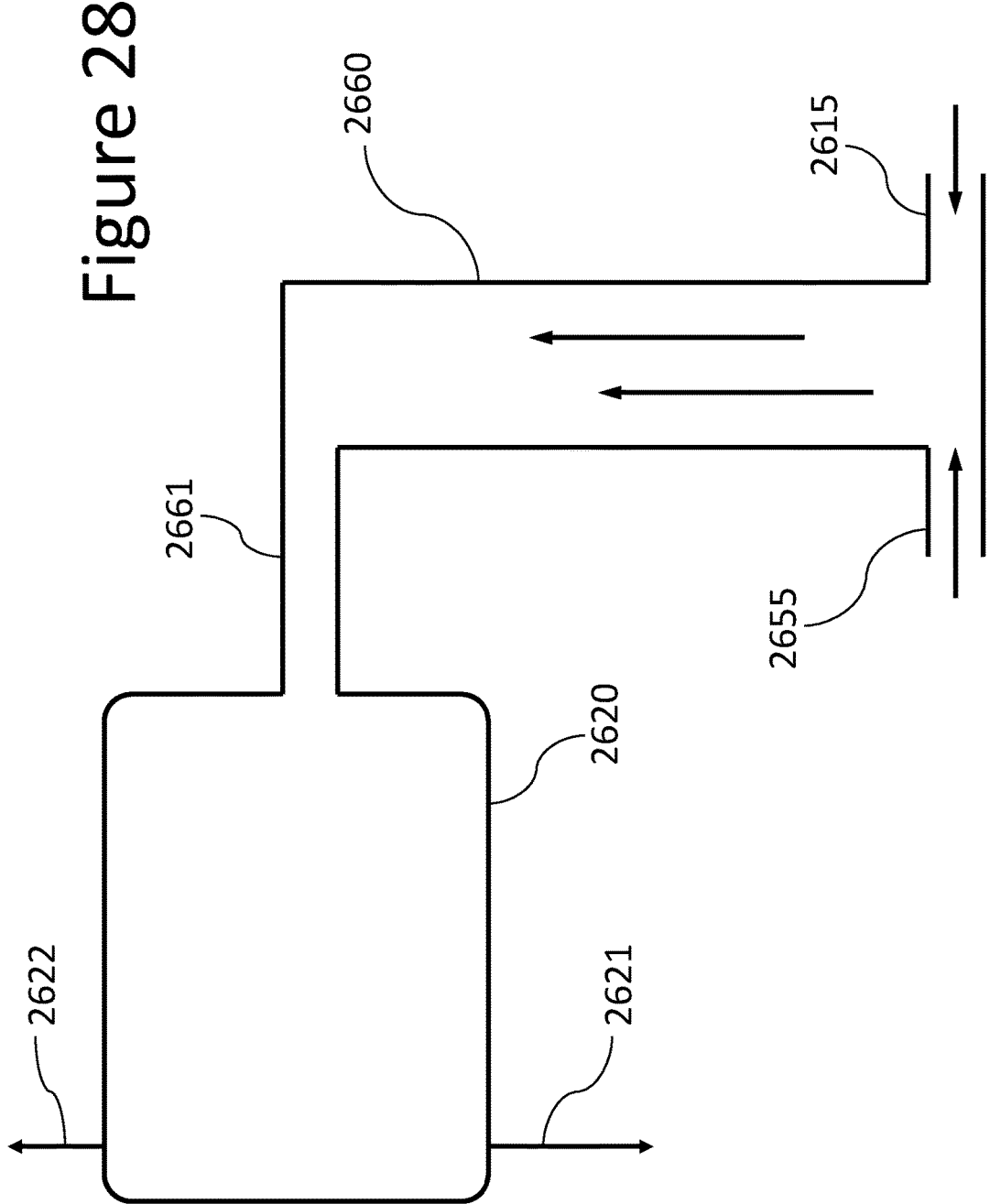
FIG. 28 is a schematic view of an alternative arrangement for the steam-crude mixing zone similar to the embodiment shown in FIG. 27 but where the crude oil and the steam added flow upwardly insuring that steam bubbles have fully condensed and collapsed before entering the gravity separator.

FIG. 28 shows a contrary allegory to the FIG. 27 embodiment where the steam-crude mixing zone 2660 has an up flowing orientation. It is sized and operated to assure that all of the steam bubbles will have collapsed and condensed prior to entering the settling vessel 2620. Again, this embodiment is compatible with the gas injection, chemical injection, each of the injector devices and the various system arrangements shown in FIGS. 3-16. One point worth noting, that is also shown in FIG. 28, is that a rather large steam inlet 2655 may be employed in the invention. In some circumstances, steam may be readily available in adequate quantities where there is also a substantial opportunity to increase the temperature of the crude oil by quite a lot. As such, the volume of steam that may be added could be sufficiently significant such that a particularly large steam inlet 2655 would be needed. For example, if five weight percent of steam is added to crude oil, this translates to adding about 500 volume percent steam to the crude oil. If six weight percent of steam were to be added to the crude oil, this translates to 600 volume percent added to the crude oil. While earlier described embodiments were shown with small and medium orifices such as a millimeter in diameter or similar effective opening area (multiple orifices), it is conceivable that a multiple inch inlet may be appropriate perhaps up to 10 inches in diameter or an inlet having an equivalent effective cross sectional area. And, a large effective inlet size may be applied to just about any arrangement of the present invention.

Figure 29:
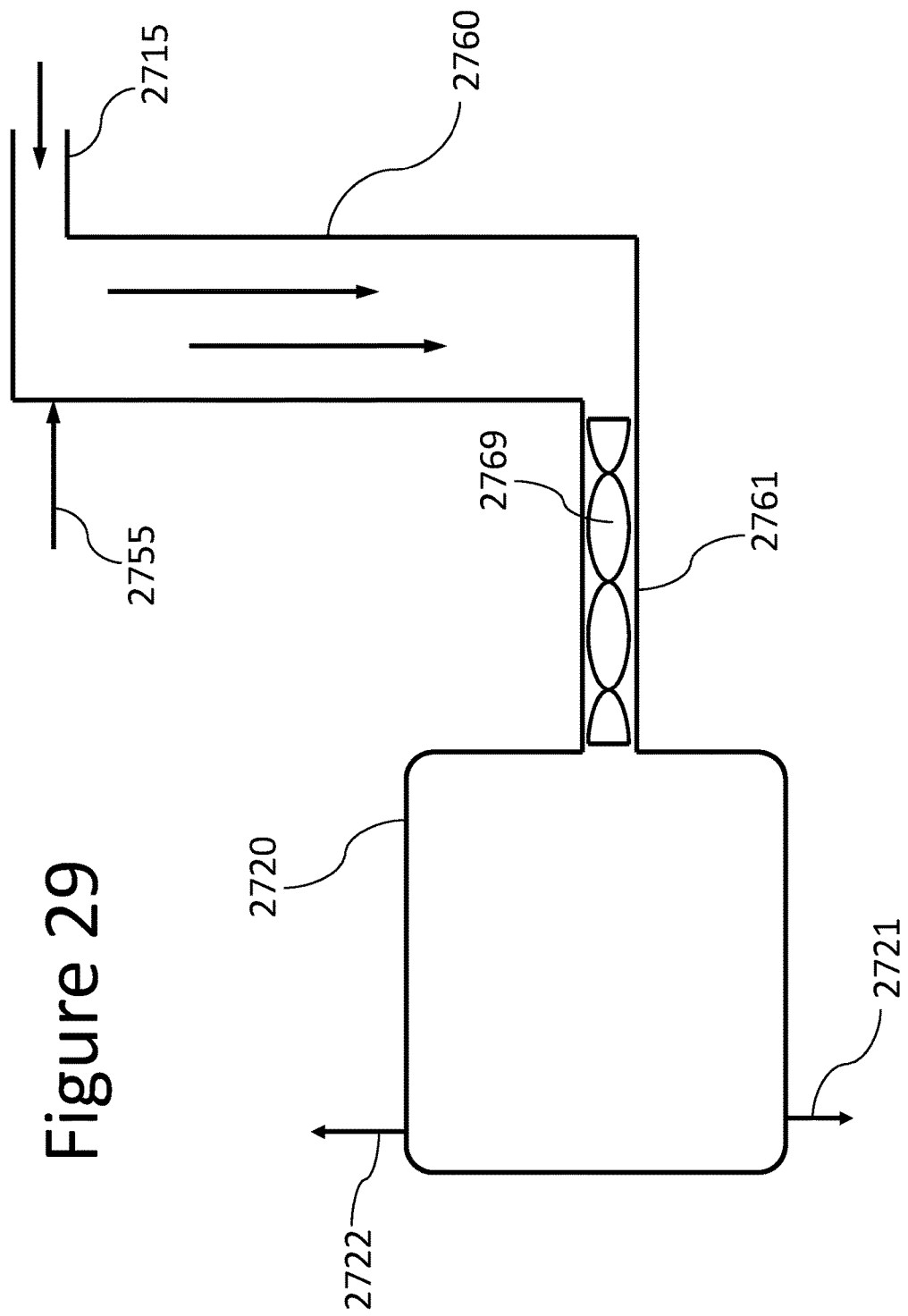
FIG. 29 is a schematic view of an alternative arrangement for desalter system where after the steam-crude mixing zone, crude oil flows across a coalescer mixer to help cause water droplets to coalesce prior to entering the gravity separator.

In another aspect of the present invention, shown in FIG. 29, once the steam bubbles have collapsed, then the focus is to get the water droplets to begin separating from the crude oil. Coalescer mixer 2769 provides gentle, low shear arrangement stirring of the crude and water mixture in a manner that gets the water droplets to move together and increase the probability of coalescing. This is done prior to the gravity separator 2720. The coalescer mixer comprises a helical blade or a segmented helical blade. This aspect is shown with the downward oriented steam-crude mixing zone 2760, but may be used in combination with other aspects of the present invention.

Figure 30:
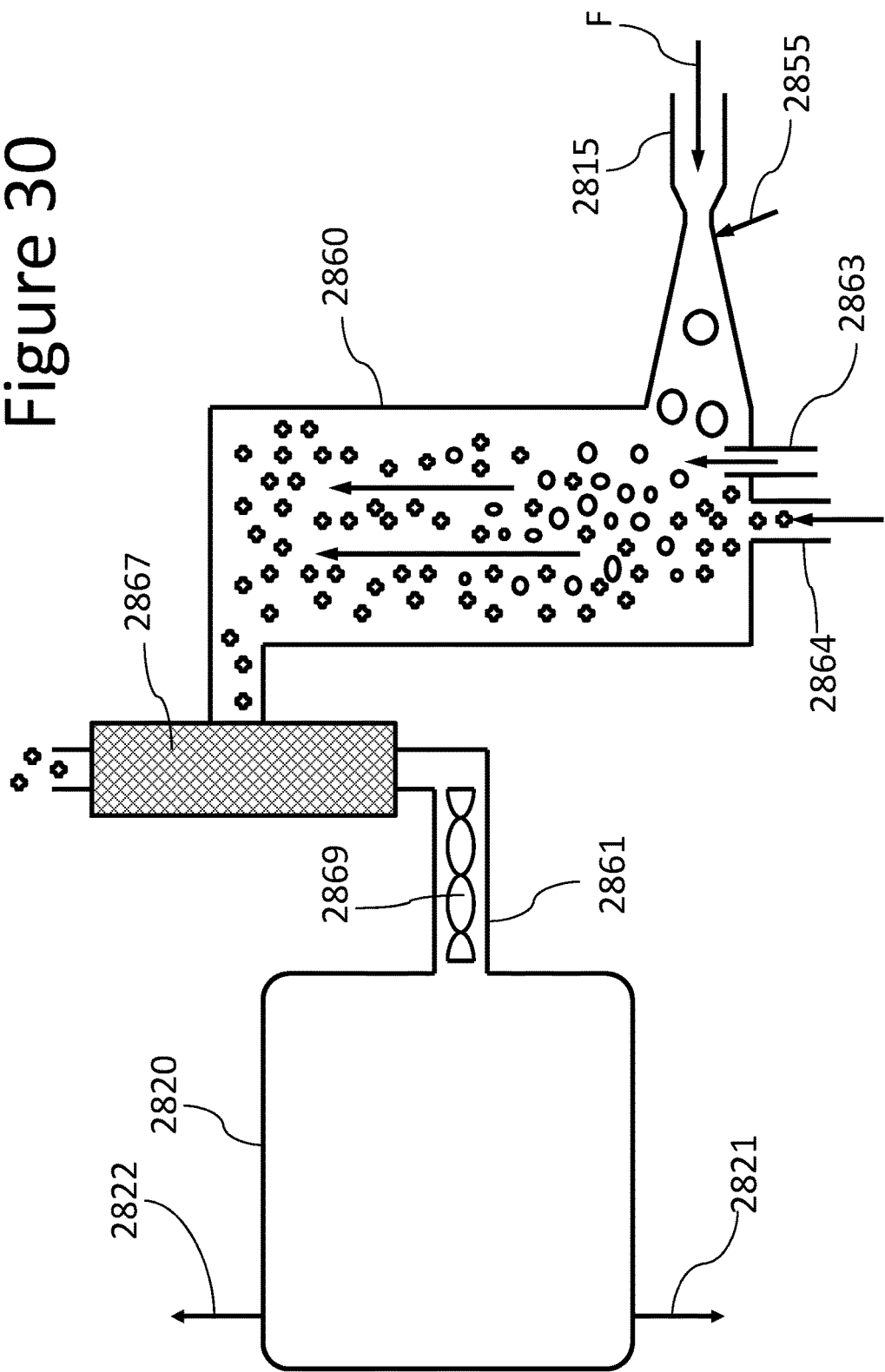
FIG. 30 is a schematic view showing that many aspects of the present invention may be combined into an operating crude oil desalter system according to the present invention where a venturi type injector may be operated with light gas agitation and a coalescer.

As noted above, multiple aspects of the described invention are potentially used together. In FIG. 30, one such combination is shown where steam is injected at a venturi injection line 2855 while a light gas is added at feedline 2864 into an upflowing steam-crude mixing zone 2860. Both chemical demulsifier and a light agitation gas are added at 2863 and 2864, respectively, while the gas is removed at separator 2867. The water droplets are coalesced at coalescer mixer 2869 and then subjected to gravity separation in gravity separator 2820.

Figure 31:
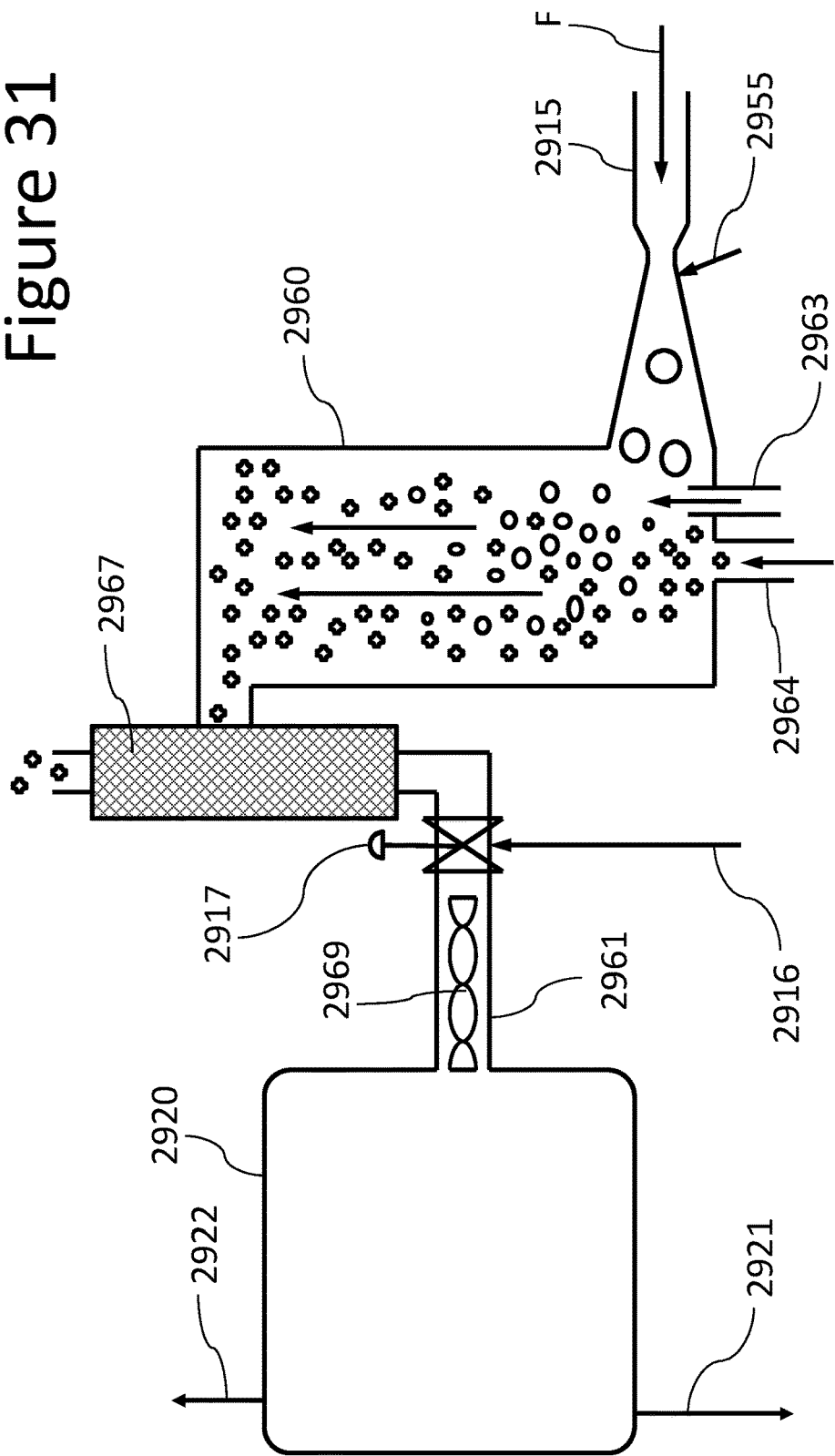
FIG. 31 is another schematic view showing the system presented in FIG. 30 with water injection and aggressive high shear mixer downstream of the steam-crude mixing zone but upstream of the coalescer mixer.
Figure 32:
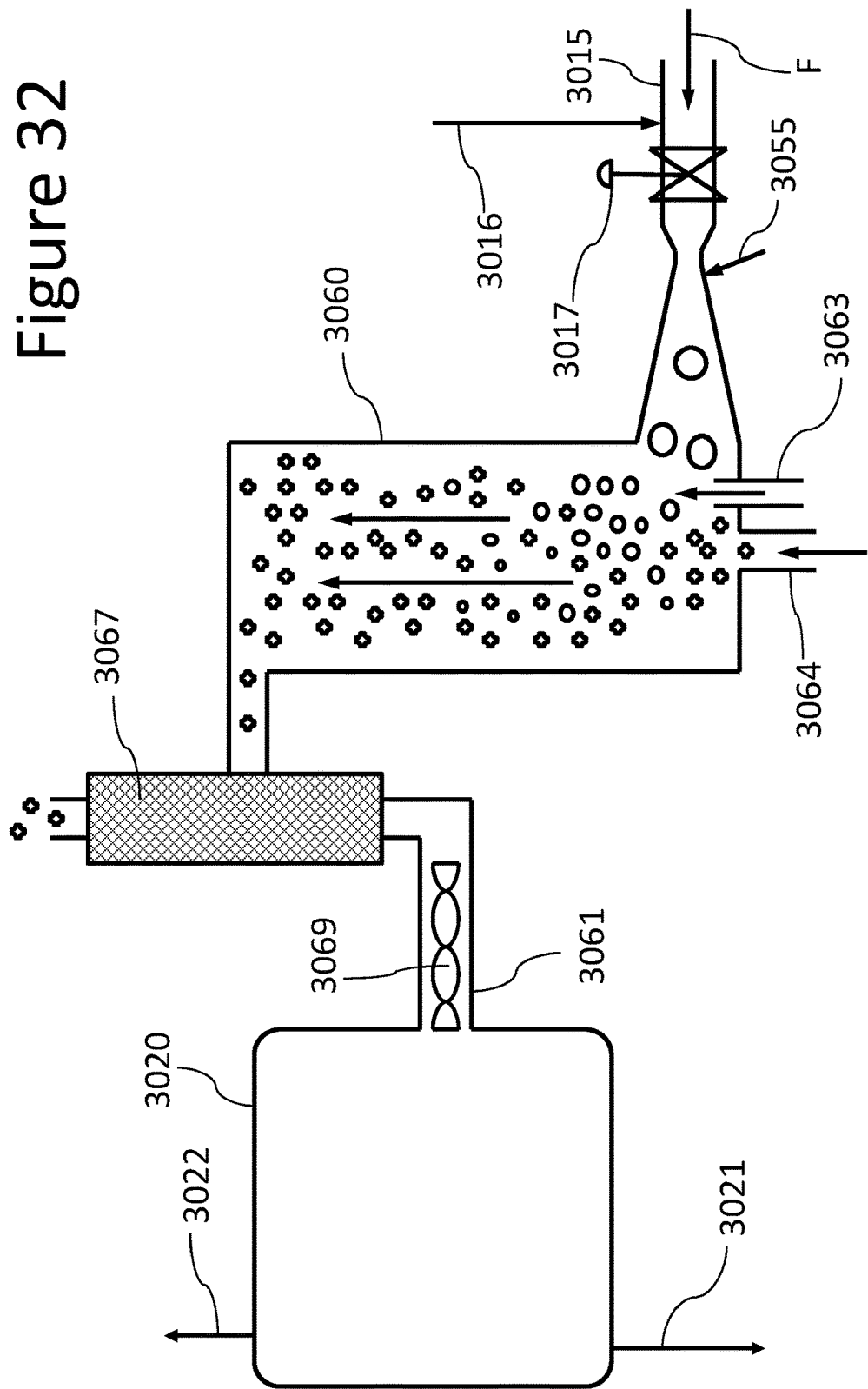
FIG. 32 is another schematic view comparable to FIG. 31 showing the desalter system presented in FIG. 30 with water injection and aggressive high shear mixer upstream of the steam injection.

In another combination, as shown in FIG. 31, water and high shear mixing are added to the embodiment shown in FIG. 30. The water is injected at feedline 2916 the mixture is subjected to aggressive high shear mixing at high shear mixer 2917 downstream of the steam-crude mixing zone 2960. A corollary to FIG. 31 is shown in FIG. 32 where the water and high shear mixing is accomplished upstream of the steam injection. In this arrangement the water is injected at water feedline 3016, aggressively mixed at high shear mixer 3017 and the steam is injected by steam injection system 3055.

It bears repeating that although the primary goal of the present invention is to take advantage of steam for desalting, one advantage of the present invention is that it is able to utilize both steam addition and wash water as in some refineries, steam is fully available and at other refineries or at other times, steam is available in limited quantities. So, when steam volumes may be reduced, the volume of wash water may be added to continue to remove salt and contaminants, even if not as effectively as a steam only system. Moreover, there may also be times when the crude oil has obtained a highest permissible temperature prior to entering the first stage of the refinery. Heat management in a refinery tends to be a rather inflexible balance. So, again, even if there is sufficient steam volume to remove salt and contaminants, the crude is already at the upper limit of the temperature and adding wash water performs more of the important function of desalting, but adds little heat to crude oil that is at its upper limits.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for removing salt from crude oil wherein the salt is in the form of particles of crystalline salt suspended in the crude oil or as small droplets of brine water suspended in the crude oil, or both, wherein the process comprises the steps of:
 a) injecting steam into the crude oil in the form of steam bubbles that are larger relative to any salt particles or relative to the any droplets of brine water so as to contact the steam bubbles with the crude oil along with any nearby suspended salt particles and brine droplets, such that a single steam bubble is adapted to contact numerous salt particles and brine droplets;
 b) condensing the steam bubbles into droplets of liquid water while at the same time dissolving available salt particles forming new brine water droplets and also delivering liquid or vaporous water from the steam bubbles into any available small brine droplets resulting in enlarged brine droplets having a size more amenable for separation from the crude oil; and
 c) separating liquid water from the crude oil where the liquid water includes the salt dissolved therein, wherein the process is more particularly characterized in that it does not include imposing high shear mixing of steam bubbles within the crude oil, and wherein the step of injecting the steam occurs in a steam-crude mixing zone where crude oil flows through a venturi tube and into the steam-crude mixing zone and steam is injected just downstream from peak flow rates of crude oil and drawn in to the venturi tube to aggressively stir the steam bubbles into the crude oil but not shear the steam bubbles.

2. The process according to claim 1 wherein the steam is injected in a manner to deliver water droplets having an average diameter of at least 10 microns and up to about 150 microns after the steam bubbles have collapsed and condensed.

3. The process according to claim 1 further including the step of adding demulsifier into the crude oil prior to the step of separating the liquid water from the crude oil.

4. The process according to claim 1 wherein the steps for separating the liquid water from the crude oil includes subjecting the crude oil to low shear coalescer mixing followed by gravity separation of the water droplets from the crude oil.

5. The process according to claim 4 further including the step of adding demulsifier into the crude oil prior to the step of separating the liquid water from the crude oil.

6. The process according to claim 1 wherein the steam is added to the crude oil at between 1 and 8 percent by weight steam to crude oil.

7. The process according to claim 1 wherein the steam is added to the crude oil at between 2 and 6 percent by weight steam to crude oil.

8. The process according to claim 1 wherein the steam is added to the crude oil at between 4 and 6 percent by weight steam to crude oil.

* * * * *